United States Patent
Ishizuka

(10) Patent No.: US 9,036,215 B2
(45) Date of Patent: May 19, 2015

(54) IMAGE FORMING APPARATUS AND IMAGE FORMING METHOD

(71) Applicant: FUJI XEROX CO., LTD., Minato-ku, Tokyo (JP)

(72) Inventor: Ryuichi Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/973,598

(22) Filed: Aug. 22, 2013

(65) Prior Publication Data
US 2014/0104658 A1   Apr. 17, 2014

(30) Foreign Application Priority Data
Oct. 16, 2012 (JP) .................................. 2012-228900

(51) Int. Cl.
| | |
|---|---|
| G06K 15/02 | (2006.01) |
| H04N 1/60 | (2006.01) |
| H04N 1/46 | (2006.01) |
| G03F 3/08 | (2006.01) |
| G03G 15/00 | (2006.01) |

(52) U.S. Cl.
CPC ........ *G06K 15/1878* (2013.01); *G03G 15/5058* (2013.01); *G03G 2215/0129* (2013.01); *G03G 2215/0164* (2013.01); *H04N 1/6044* (2013.01)

(58) Field of Classification Search
CPC .............. H04N 1/6033; H04N 1/6097; B41F 33/0036; B41F 33/0045; B65H 2220/03
USPC .................. 358/3.24, 1.9, 504, 518
See application file for complete search history.

(56) References Cited

U.S. PATENT DOCUMENTS

| | | | | |
|---|---|---|---|---|
| 7,626,728 B2 * | 12/2009 | Itagaki et al. | .................. | 358/1.9 |
| 2006/0066882 A1 * | 3/2006 | Yamauchi et al. | ............. | 358/1.9 |

FOREIGN PATENT DOCUMENTS

JP    2004-056574 A    2/2004

* cited by examiner

*Primary Examiner* — Charlotte M Baker
(74) *Attorney, Agent, or Firm* — Sughrue Mion, PLLC

(57) ABSTRACT

An image forming apparatus includes a color measurement portion printing unit, a colorimeter, and an image evaluating unit. The color measurement portion printing unit prints at least one color measurement portion. The colorimeter measures a color of the color measurement portion. The image evaluating unit evaluates, on the basis of a measured color value obtained by the colorimeter and a predetermined reference value, whether or not an image printed in response to a print request satisfies quality requirements that are based on a predetermined standard. The image evaluating unit evaluates whether or not the image satisfies the quality requirements, on the basis of a measured color value of a color measurement portion whose color is the same as a color used in the image or whose color difference from the color used in the image is within a predetermined range, among plural color measurement portions.

19 Claims, 18 Drawing Sheets

FIG. 6

| No. | C | M | Y | K | L* | a* | b* |
|---|---|---|---|---|---|---|---|
| 1 | 100 | 0 | 0 | 0 | L*t1 | a*t1 | b*t1 |
| 2 | 70 | 0 | 0 | 0 | L*t2 | a*t2 | b*t2 |
| 3 | 40 | 0 | 0 | 0 | L*t3 | a*t3 | b*t3 |
| 4 | 20 | 0 | 0 | 0 | L*t4 | a*t4 | b*t4 |
| 5 | 0 | 100 | 0 | 0 | L*t5 | a*t5 | L*t5 |
| 6 | 0 | 70 | 0 | 0 | L*t6 | a*t6 | b*t6 |
| 7 | 0 | 40 | 0 | 0 | L*t7 | a*t7 | b*t7 |
| 8 | 0 | 20 | 0 | 0 | L*t8 | a*t8 | b*t8 |
| 9 | 0 | 0 | 100 | 0 | L*t9 | a*t9 | b*t9 |
| 10 | 0 | 0 | 70 | 0 | L*t10 | a*t10 | b*t10 |
| 11 | 0 | 0 | 40 | 0 | L*t11 | a*t11 | b*t11 |
| 12 | 0 | 0 | 20 | 0 | L*t12 | a*t12 | b*t12 |
| 45 | 40 | 70 | 0 | 60 | L*t45 | a*t45 | b*t45 |
| 46 | 70 | 40 | 0 | 60 | L*t46 | a*t46 | b*t46 |
| 47 | 70 | 70 | 70 | 0 | L*t47 | a*t47 | b*t47 |
| 48 | 100 | 100 | 100 | 0 | L*t48 | a*t48 | b*t48 |
| 49 | 8 | 6 | 6 | 0 | L*t49 | a*t49 | b*t49 |
| 50 | 15 | 11 | 11 | 0 | L*t50 | a*t50 | b*t50 |
| 51 | 23 | 18 | 17 | 0 | L*t51 | L*t51 | b*t51 |
| 52 | 32 | 25 | 25 | 0 | L*t52 | a*t52 | b*t52 |
| 53 | 60 | 52 | 52 | 0 | L*t53 | a*t53 | b*t53 |
| 54 | 0 | 0 | 0 | 0 | L*t54 | a*t54 | b*t54 |

COLOR MEASUREMENT PORTION IN WHICH
DIFFERENCE BETWEEN MEASURED COLOR VALUE AND
REFERENCE VALUE EXCEEDS THRESHOLD

FIG. 9

SET STANDARD

| COLOR CHIP NUMBER | CHECK 1 | CHECK 2 | CHECK 3 |
|---|---|---|---|
| 1 | ☑ | ☐ | ☐ |
| 2 | ☑ | ☐ | ☐ |
| 3 | ☐ | ☑ | ☐ |
| 4 | ☐ | ☑ | ☐ |
| 5 | ☐ | ☐ | ☑ |
| 6 | ☐ | ☐ | ☑ |

CHECK 1:
☑ THRESHOLD OF ΔE: 6.0 OR LESS
☑ THRESHOLD OF ΔH: 4.0 OR LESS

CHECK 2:
☑ THRESHOLD OF ΔE: 3.0 OR LESS
☐ THRESHOLD OF ΔH: 3.0 OR LESS

CHECK 3:
☐ THRESHOLD OF ΔE: 2.0 OR LESS
☑ THRESHOLD OF ΔH: 1.5 OR LESS

OK   CANCEL

FIG. 10

| COLOR CHIP NUMBER | CHECK 1 | CHECK 2 | C | M | Y | K | L* | a* | b* |
|---|---|---|---|---|---|---|---|---|---|
| 1 | ☑ | ☐ | : | : | : | : | : | : | : |
| 2 | ☑ | ☐ | : | : | : | : | : | : | : |
| 3 | ☐ | ☑ | : | : | : | : | : | : | : |
| 4 | ☐ | ☑ | : | : | : | : | : | : | : |
| 5 | ☑ | ☐ | : | : | : | : | : | : | : |
| 6 | ☐ | ☑ | : | : | : | : | : | : | : |

SET STANDARD

CHECK 1:
☑ THRESHOLD OF ΔE: 6.0 OR LESS
☑ THRESHOLD OF ΔH: 4.0 OR LESS

CHECK 2:
☑ THRESHOLD OF ΔE: 3.0 OR LESS
☐ THRESHOLD OF ΔH: 3.0 OR LESS

CHECK 3:
☐ THRESHOLD OF ΔE: 2.0 OR LESS
☑ THRESHOLD OF ΔH: 1.5 OR LESS

OK   CANCEL

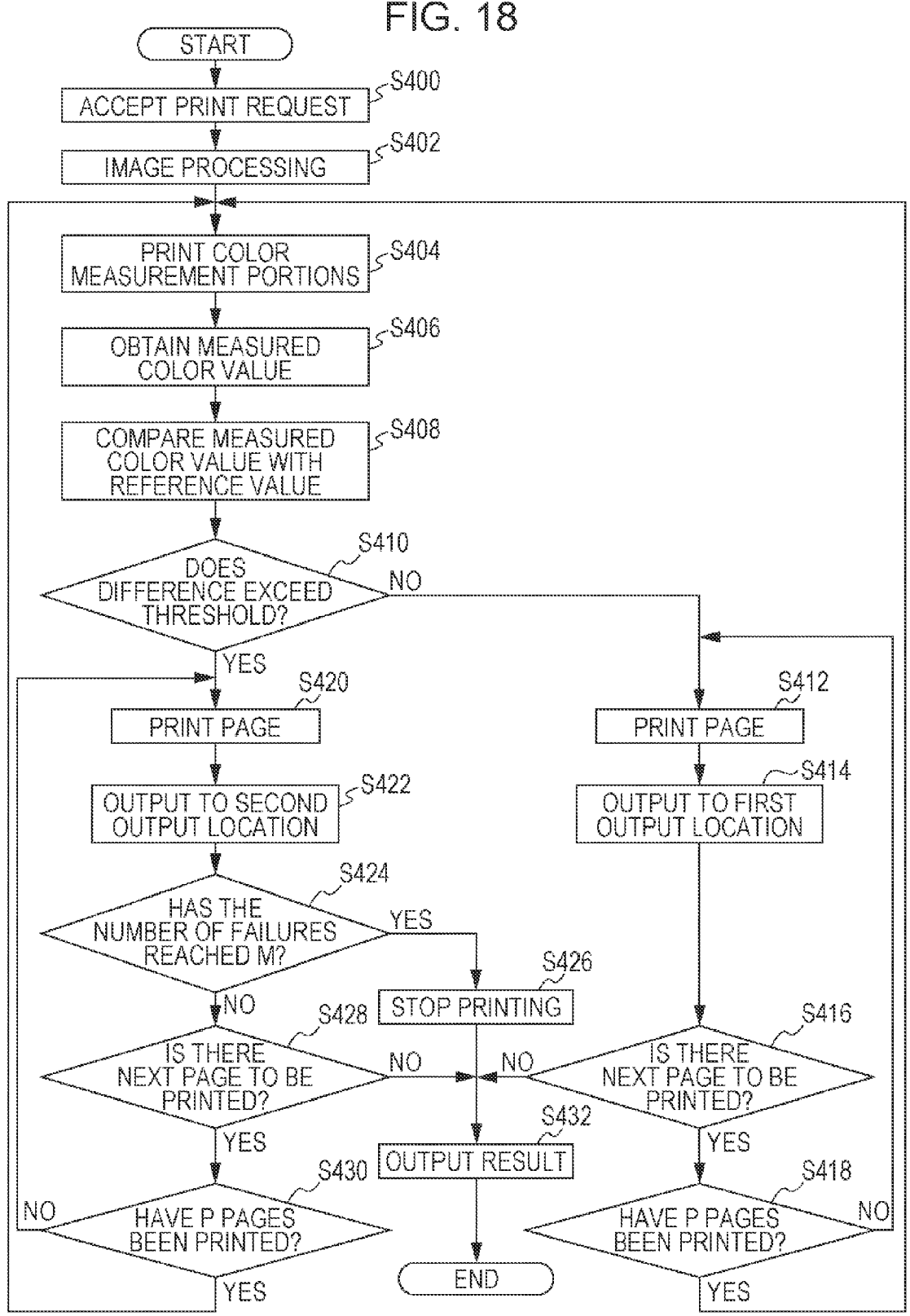

IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2012-228900 filed Oct. 16, 2012.

BACKGROUND

Technical Field

The present invention relates to an image forming apparatus and an image forming method.

SUMMARY

According to an aspect of the invention, there is provided an image forming apparatus including a color measurement portion printing unit, a colorimeter, and an image evaluating unit. The color measurement portion printing unit prints at least one color measurement portion. The colorimeter measures a color of the color measurement portion printed by the color measurement portion printing unit. The image evaluating unit evaluates, on the basis of a measured color value obtained by the colorimeter and a predetermined reference value, whether or not an image printed in response to a print request satisfies quality requirements that are based on a predetermined standard. The image evaluating unit evaluates whether or not the image satisfies the quality requirements, on the basis of a measured color value of a color measurement portion whose color is the same as a color used in the image or whose color difference from the color used in the image is within a predetermined range, among plural color measurement portions printed by the color measurement portion printing unit.

BRIEF DESCRIPTION OF THE DRAWINGS

Exemplary embodiments of the present invention will be described in detail based on the following figures, wherein:

FIG. 6 is a table illustrating an example of data about Japan Color stored in a reference data memory;

FIG. 9 is a plan view illustrating an example of a standard setting screen displayed on the UI device;

FIG. 10 is a plan view illustrating an example of a setting screen used for setting a standard and color measurement portions;

FIG. 18 is a flowchart illustrating an example of the operation performed by an image forming apparatus according to the fourth exemplary embodiment.

DETAILED DESCRIPTION

Figure 1:
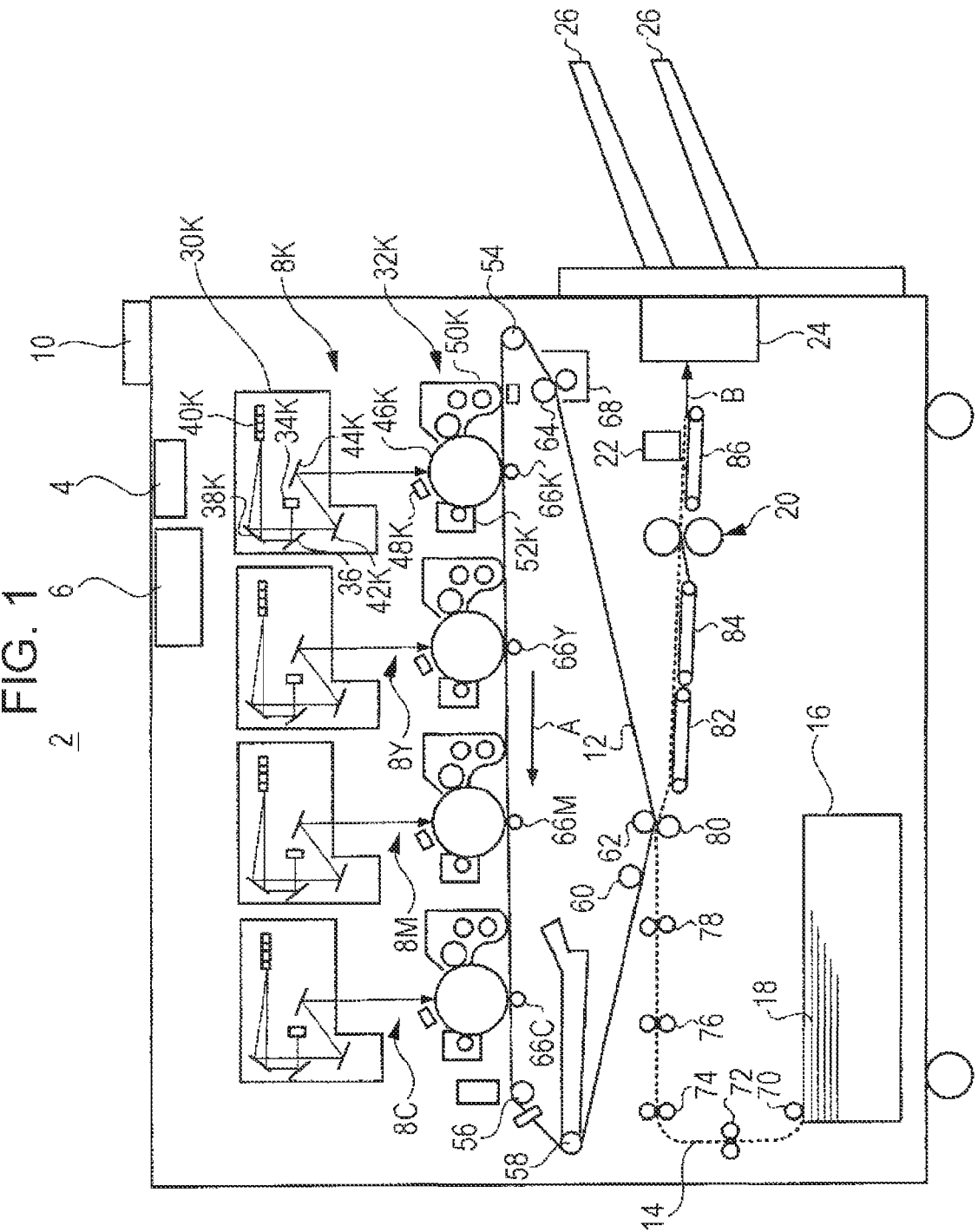
FIG. 1 is a schematic diagram of an image forming apparatus according to a first exemplary embodiment of the present invention.

Hereinafter, exemplary embodiments of the present invention will be described in detail with reference to the drawings. FIG. 1 is a schematic diagram of an image forming apparatus 2 according to a first exemplary embodiment of the present invention.

As illustrated in FIG. 1, the image forming apparatus 2 includes a communication device 4, an image processing device 6, plural image forming units 8, a user interface (UI) device 10, an intermediate transfer belt 12, a sheet transport path 14, a sheet tray 16, a fixing device 20, a colorimeter 22, an output mechanism 24, an output tray 26, and so forth.

The image forming apparatus 2 has a printing function of printing an image in response to a print request (print job) received by the communication device 4 via a network.

First, an overview of the image forming apparatus 2 will be described. The image forming apparatus 2 is provided with, for example, at an upper portion thereof, the communication device 4 and the image processing device 6. The communication device 4 is, for example, a data line terminal device that communicates with an external device via a network, such as a local area network (LAN). The image processing device 6 performs processing, which will be described below, in response to a print request received via the communication device 4, and outputs the result to the image forming units 8. In this exemplary embodiment, a description will be given of an example in which the image forming apparatus 2 performs printing in response to a print request received via the communication device 4. However, the image forming apparatus 2 may print image data read by an image reader, such as a scanner, or may print image data read from a portable storage medium.

On the upper surface of the image forming apparatus 2, the UI device 10 such as a touch panel is provided. The UI device 10 functions as an input/output device that displays information about the operation of the image forming apparatus 2 and accepts input by a user, such as input of an operation.

Further, the image forming apparatus 2 is provided with the plural image forming units 8, which correspond to colors forming a color image. In this exemplary embodiment, a first image forming unit 8K, a second image forming unit 8Y, a third image forming unit 8M, and a fourth image forming unit 8C corresponding to black (K), yellow (Y), magenta (M), and cyan (C) are horizontally arranged at certain intervals along the intermediate transfer belt 12. The intermediate transfer belt 12 serves as an intermediate transfer body and is rotated in the direction indicated by an arrow A in FIG. 1.

These four image forming units 8K, 8Y, 8M, and 8C sequentially form toner images of the individual colors on the basis of image data received from the image processing device 6, and transfer the toner images onto the intermediate transfer belt 12 at the timings when these toner images are superposed one on top of another (first transfer). The order of the colors of the image forming units 8K, 8Y, 8M, and 8C is not limited to the order K, Y, M, and C, but a different order may be used, for example, Y, M, C, and K.

The sheet transport path 14 is disposed below the intermediate transfer belt 12. A recording sheet 18, which is a recording medium supplied from the sheet tray 16, is transported along the sheet transport path 14, toner images of the individual colors transferred onto the intermediate transfer belt 12 in a superposed manner are collectively transferred onto the recording sheet 18 (second transfer), the transferred toner images are fixed by the fixing device 20, and the recording sheet 18 is output to the outside in the direction indicated by an arrow B.

Here, the recording sheet 18 to which the toner images have been fixed by the fixing device 20 has color measurement portions (described below) thereon, the color measurement portions are subjected to color measurement performed by the colorimeter 22, which is provided downstream of the fixing device 20, and then the recording sheet 18 is output to the output tray 26 by the output mechanism 24.

Next, the configuration of the image forming apparatus 2 will be described in more detail.

The image processing device 6 performs image processing, such as RIP processing, color conversion processing, or screen processing, in response to a print request received via the communication device 4, and outputs processed image data to the image forming units 8. In color conversion processing, for example, the image processing device 6 converts image data of a first color space (CMYK color space) input to the image processing device 6 to image data of a second color space (CMYK color space) that is to be used for processing performed by the image forming units 8. In color conversion processing, processing of changing a color space is performed by using a profile such as a look-up table (LUT), which is information indicating the correspondence between different color spaces. The conversion from the first color space to the second color space may be performed via conversion to a device-independent color space, such as the L*a*b* color system.

Also, the image processing device 6 according to this exemplary embodiment performs processing of combining an image that is based on a print request (an image to be printed in response to a print job) and an image of color measurement portions.

The first image forming unit 8K, the second image forming unit 8Y, the third image forming unit 8M, and the fourth image forming unit 8C are arranged in parallel at certain intervals in the horizontal direction, and have the same configuration except that the colors of images formed thereby are different. Hereinafter, the first image forming unit 8K will be described. Note that the elements of the individual image forming units 8 are distinguished from one another by adding K, Y, M, or C after reference numerals.

The first image forming unit 8K includes an optical scanning device 30K that scans a laser beam in accordance with image data received from the image processing device 6, and an image forming device 32K that forms an electrostatic latent image using the laser beam scanned by the optical scanning device 30K.

The optical scanning device 30K modulates a semiconductor laser 34K in accordance with image data of black (K), and causes the semiconductor laser 34K to emit a laser beam LB (K) in accordance with the image data. The laser beam LB (K) emitted from the semiconductor laser 34K is applied to a rotary polygon mirror 40K via a first reflective mirror 36K and a second reflective mirror 38K, is deflected and scanned by the rotary polygon mirror 40K, and is applied onto a photoconductor drum 46K of the image forming device 32K via the second reflective mirror 38K, a third reflective mirror 42K, and a fourth reflective mirror 44K.

The image forming device 32K includes the photoconductor drum 46K, serving as an image carrier which rotates at a certain rotation speed along the direction indicated by the arrow A; a scorotron 48K for first charging, serving as a charging unit for causing the surface of the photoconductor drum 46K to be evenly charged; a developing device 50K for developing an electrostatic latent image formed on the photoconductor drum 46K; and a cleaning device 52K. The photoconductor drum 46K is evenly charged by the scorotron 48K, and an electrostatic latent image is formed thereon due to the laser beam LB (K) applied from the optical scanning device 30K. The electrostatic latent image formed on the photoconductor drum 46K is developed by the developing device 50K using a black toner, and is transferred onto the intermediate transfer belt 12. A residual toner and paper dust or the like that remain on the photoconductor drum 46K after transfer of the toner image are removed by the cleaning device 52K.

The other image forming units 8Y, 8M, and 8C form toner images of Y, M, and C, respectively, in a manner similar to that described above, and transfer the respective toner images of the respective colors onto the intermediate transfer belt 12.

The intermediate transfer belt 12 extends around a drive roller 54, a first idle roller 56, a steering roller 58, a second idle roller 60, a backup roller 62, and a third idle roller 64 at a certain tension, and is driven to rotate at a certain speed in the direction indicated by the arrow A when the drive roller 54 is driven to rotate by a driving motor (not illustrated). The intermediate transfer belt 12 is an endless belt formed by, for example, forming a band made of a synthetic-resin film having elasticity, such as a polyimide film, and connecting both ends of the band using welding or the like.

Further, a first first-transfer roller 66K, a second first-transfer roller 66Y, a third first-transfer roller 66M, and a fourth first-transfer roller 66C are provided along the intermediate transfer belt 12, at the positions facing the individual image forming units 8K, 8Y, 8M, and 8C. Toner images of the respective colors that have been formed on the photoconductor drums 46K, 46Y, 46M, and 46C are transferred onto the intermediate transfer belt 12 by these first-transfer rollers 66 so as to be superposed one on top of another. A residual toner on the intermediate transfer belt 12 is removed by a cleaning blade or brush of a belt cleaner 68 provided downstream of a second-transfer position.

A feed roller 70 for taking the recording sheet 18 from the sheet tray 16; a first pair of rollers 72, a second pair of rollers 74, and a third pair of rollers 76 for transporting the recording sheet 18; and registration rollers 78 for transporting the recording sheet 18 to the second-transfer position at a predetermined timing, are provided along the sheet transport path 14.

Further, a second-transfer roller 80 that is in contact with the backup roller 62 is provided at the second-transfer position along the sheet transport path 14. Toner images of the respective colors transferred onto the intermediate transfer belt 12 so as to be superposed one on top of another are second-transferred onto the recording sheet 18 due to the contact pressure and static electricity generated by the second-transfer roller 80. The recording sheet 18 onto which the toner images of the respective colors have been transferred is transported to the fixing device 20 by a first transport belt 82 and a second transport belt 84.

The fixing device 20 performs heating and pressurization on the recording sheet 18 onto which the toner images of the respective colors have been transferred, thereby causing the toner to be melted and fixed to the recording sheet 18. The recording sheet 18 that has undergone pressurization by the fixing device 20 is transported by a third transport belt 86, and thereby passes through the colorimeter 22.

The colorimeter 22 is constituted by, for example, a spectral colorimeter that applies light to the recording sheet 18, divides reflected light therefrom, and measures the reflectance of each wavelength. The colorimeter 22 measures the color of a color measurement portion (described below) on the recording sheet 18 by measuring a spectrum. In this exemplary embodiment, the colorimeter 22 measures the color of a color measurement portion, and outputs a measured color value as L*a*b* values.

The output mechanism 24 outputs the recording sheet 18 to the output tray 26. In this exemplary embodiment, plural output trays 26 are provided in the image forming apparatus 2. The output mechanism 24 is configured to output the recording sheet 18 to any one of the plural output trays 26. Alternatively, a single output tray 26 may be provided in the image forming apparatus 2. In this case, with the use of offset output, the recording sheet 18 may be output to any one of plural output locations of the single output tray 26. Alternatively, plural output trays 26 may be provided, and the recording sheet 18 may be output to any one of plural output locations of any one of the output trays 26.

Figure 2:
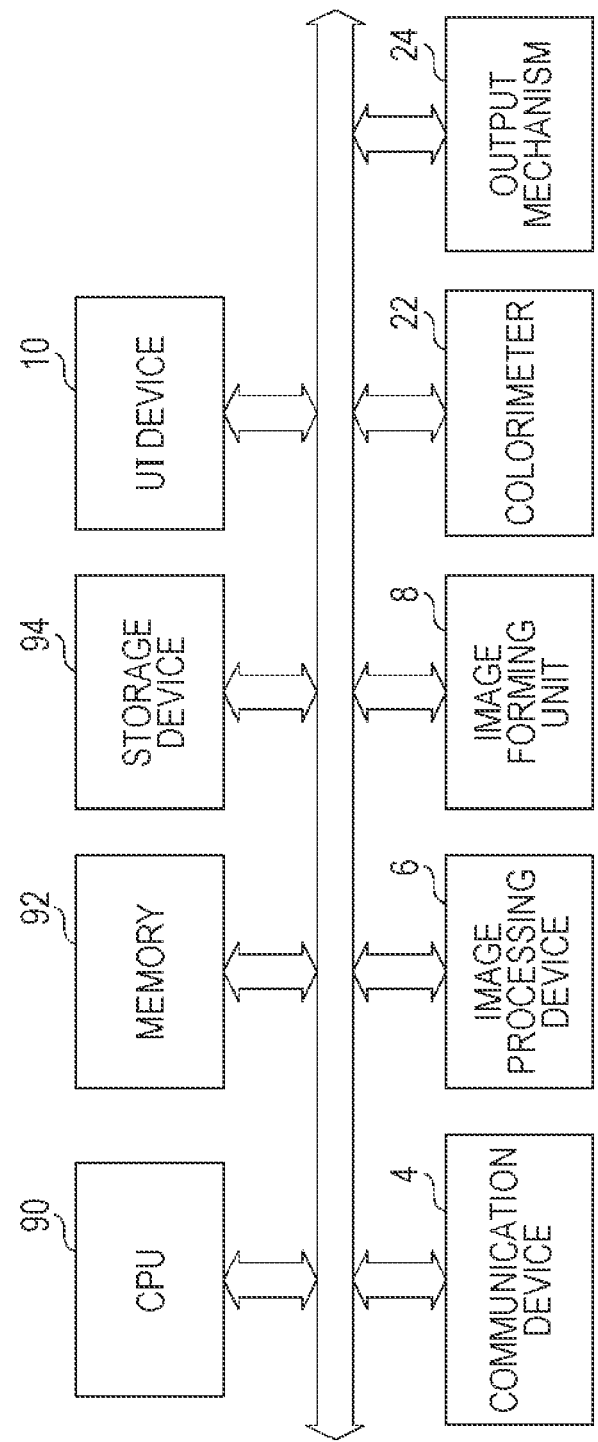
FIG. 2 is a schematic diagram illustrating the hardware configuration of the image forming apparatus according to the first exemplary embodiment of the present invention.

FIG. 2 is a schematic diagram illustrating the hardware configuration of the image forming apparatus 2.

As illustrated in FIG. 2, the image forming apparatus 2 includes a central processing unit (CPU) 90, a memory 92, a storage device 94, the UI device 10, the communication device 4, the image processing device 6, the image forming units 8, the colorimeter 22, and the output mechanism 24. The image forming apparatus 2 includes a component serving as a computer that is capable of performing communication via a network.

The CPU 90 executes processing in accordance with a program stored in the memory 92. The storage device 94 is, for example, a built-in hard disk drive (HDD) or the like. The CPU 90 may execute a program stored in the storage device 94.

The CPU 90 may execute a program stored in a storage medium such as a memory card, or may execute a program provided via the communication device 4.

Figure 3:
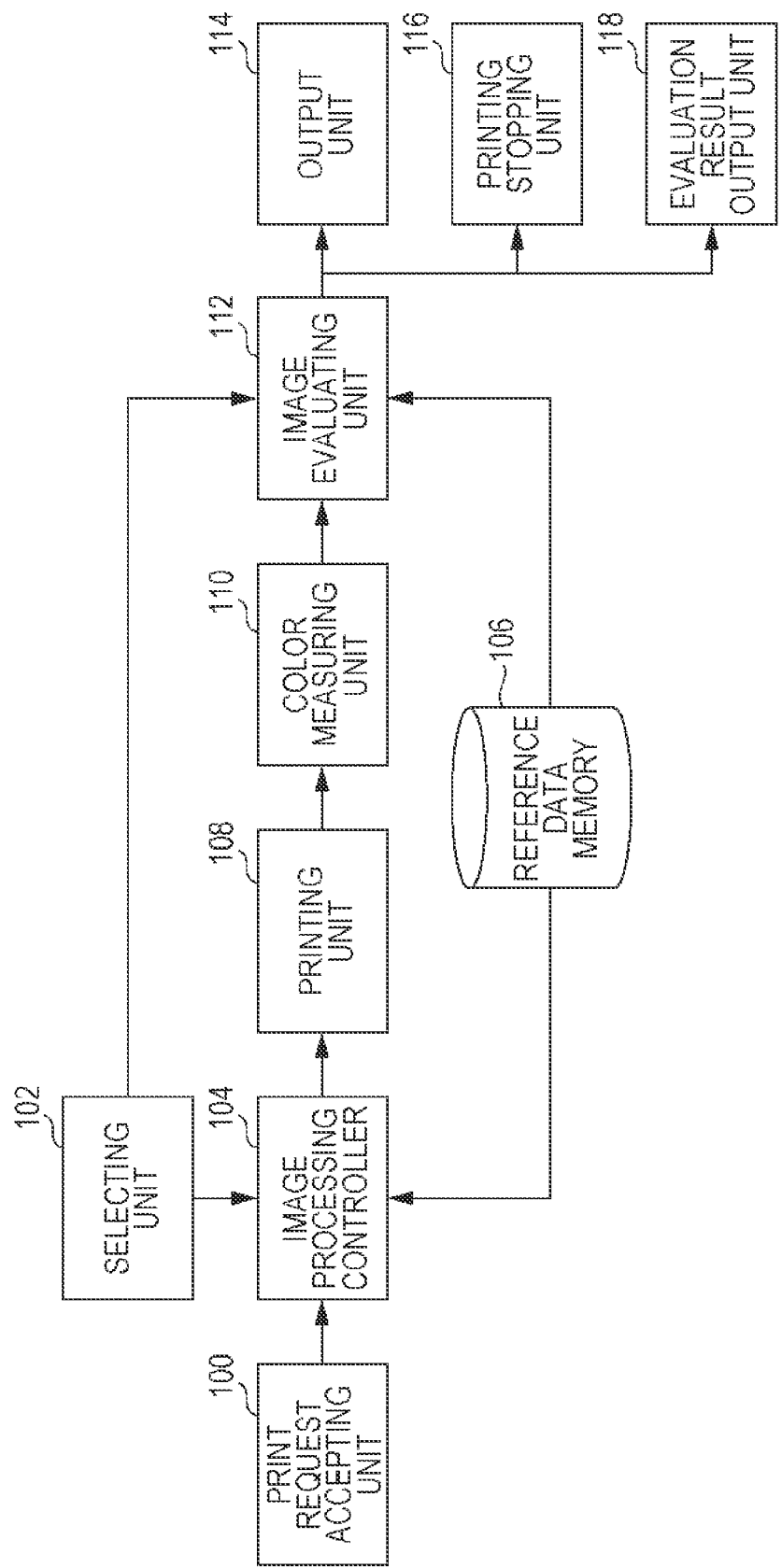
FIG. 3 is a block diagram illustrating the functional configuration of the image forming apparatus implemented by executing a program.

FIG. 3 is a block diagram illustrating the functional configuration of the image forming apparatus 2, which is implemented by executing a program. Part or the whole of the configuration illustrated in FIG. 3 may be implemented by hardware, such as an application specific integrated circuit (ASIC) or a field programmable gate array (FPGA).

As illustrated in FIG. 3, the image forming apparatus 2 includes a print request accepting unit 100, a selecting unit 102, an image processing controller 104, a reference data memory 106, a printing unit 108, a color measuring unit 110, an image evaluating unit 112, an output unit 114, a printing stopping unit 116, and an evaluation result output unit 118.

The print request accepting unit 100 accepts a print request (print job) received via the communication device 4.

The selecting unit 102 selects, from among predetermined standards about colors for printing, a standard used for evaluation performed by the image evaluating unit 112, which will be described below. In this exemplary embodiment, the selecting unit 102 selects any one of standards about colors for printing, such as Japan Color, UGRA/Fogra, and IDAlliance. The selecting unit 102 selects a standard in accordance with, for example, an instruction input from the UI device 10.

Figure 4:
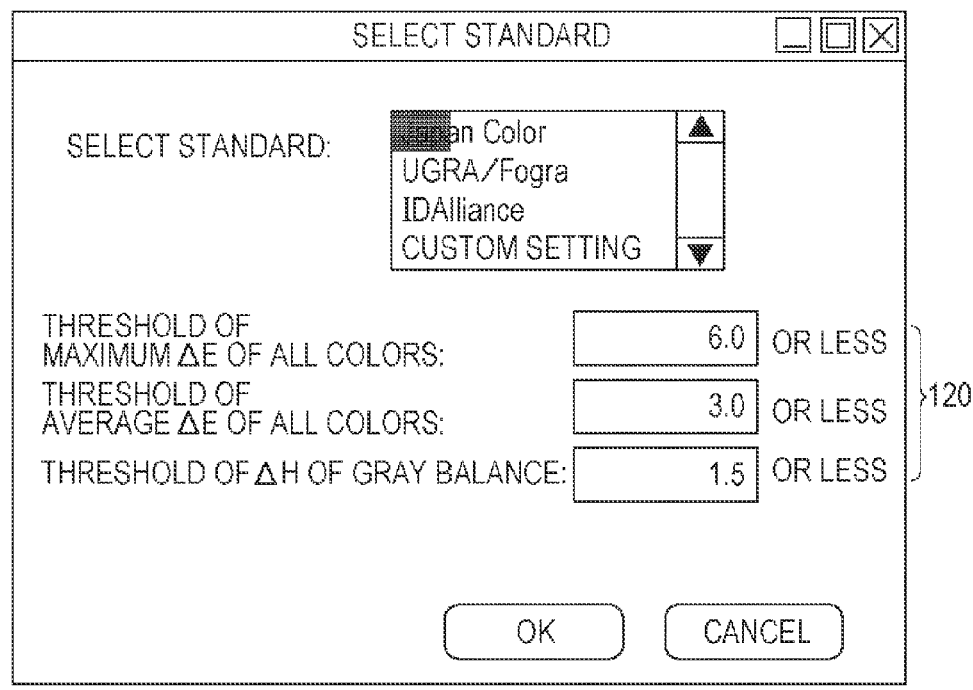
FIG. 4 is a plan view illustrating an example of a standard selection screen displayed on a UI device.

FIG. 4 is a plan view illustrating an example of a standard selection screen displayed on the UI device 10. As illustrated in FIG. 4, a screen for accepting an instruction to select a standard is displayed on the UI device 10, and a standard specified by a user operation is selected as a standard to be used for evaluation performed by the image evaluating unit 112, which will be described below.

In the example of the standard selection screen illustrated in FIG. 4, conditions for satisfying a standard are displayed in a condition display area 120 on the screen.

The image processing controller 104 controls the image processing device 6, and executes the above-described image processing. When controlling the image processing device 6, the image processing controller 104 obtains, from the reference data memory 106, color data of color measurement portions that is based on the standard selected by the selecting unit 102.

Also, the image processing controller 104 controls the image processing device 6 to convert CMYK values of a first color space about color measurement portions obtained from the reference data memory 106 to CMYK values of a second color space used in the processing performed by the image processing units 8.

Further, the image processing controller 104 performs control so that the image processing device 6 combines a raster image which is generated through RIP processing in response to a print request and an image that is based on the color data obtained from the reference data memory 106 (color measurement portions).

Figure 5:
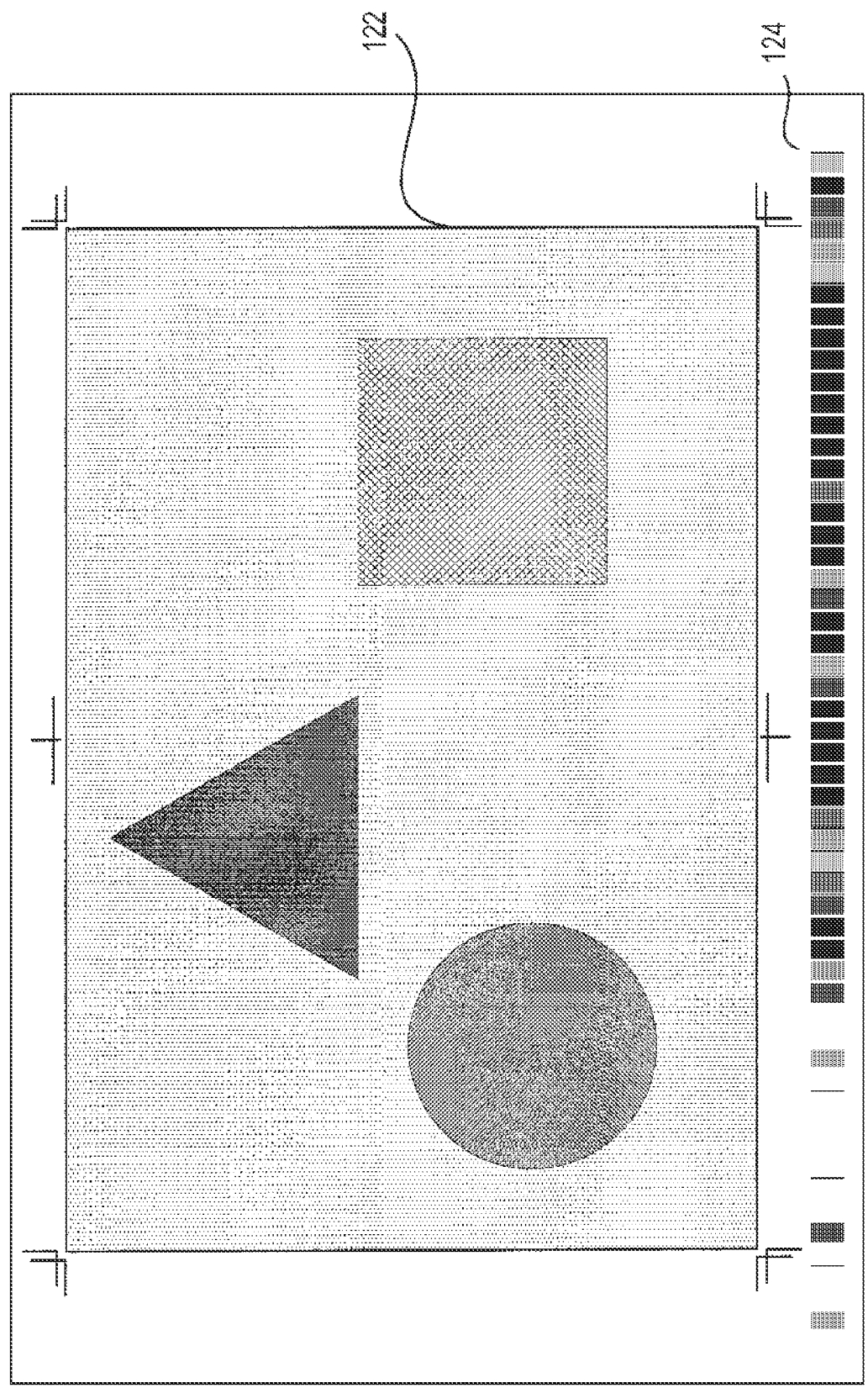
FIG. 5 is a diagram illustrating an example of an image obtained by combining an image based on a print request and color measurement portions.

FIG. 5 is a diagram illustrating an example of an image generated by combining an image that is based on a print request and color measurement portions. The composite image illustrated in FIG. 5 includes 54 types of color measurement portions, as will be described below.

In the example illustrated in FIG. 5, an image 122 that is based on a print request is combined with color measurement portions, which are 54 types of color chip images 124 used for determining whether or not the standard of Japan Color is satisfied.

In this example, the standard of Japan Color is selected as a standard by the selecting unit 102. In this case, the image processing controller 104 performs control to obtain information about Japan Color stored in the reference data memory 106 and at least combine color chips for a test for determining whether or not the standard is satisfied.

In the example illustrated in FIG. 5, color measurement portions are disposed in a lower part of the image that is based on a print request. In this way, according to this exemplary embodiment, images that are based on color data obtained from the reference data memory 106 are combined at a predetermined position outside the area of the image that is based on a print request.

The image processing device 6 performs image processing, such as color conversion processing and screen processing, on the composite image under the control performed by the image processing controller 104.

The reference data memory 106 stores data about predetermined standards about colors for printing. Specifically, the reference data memory 106 stores data for generating color measurement portions and reference values of color measurement about the color measurement portions. In this exemplary embodiment, the reference data memory 106 stores, for each of predetermined standards about colors for printing, data of color chips (color measurement portions) of predetermined types of colors used for determining whether or not quality requirements that are based on the standard are satisfied.

For example, the reference data memory 106 stores, for each of standards such as Japan Color, data about color chips for a test for determining whether or not the standard is satisfied.

FIG. 6 is a table illustrating an example of data about Japan Color stored in the reference data memory 106. As illustrated in FIG. 6, the reference data memory 106 stores, for each of 54 types of color chips for determining whether or not the standard of Japan Color is satisfied, CMYK values for generating a color measurement portion and L*a*b* values serving as reference values of color measurement of a color measurement portion that is printed on the basis of the CMYK values, in association with each other.

The printing unit 108 prints an image that is based on a print request, and also prints color measurement portions. In this exemplary embodiment, as described above, the printing unit 108 prints a composite image in which an image that is based on a print request is combined with an image of color measurement portions, on a recording medium. Accordingly, the image illustrated in FIG. 5 is printed on the recording medium. In this way, an image that is based on a print request and an image of color measurement portions are printed on the same page. This suppresses the occurrence of a difference in quality between printing of the image that is based on a print request and printing of the image of the color measurement portions for evaluating the image, and the image that is based on a print request is evaluated with higher accuracy than in the case of separately printing the image that is based on a print request and the image of color measurement portions.

In this exemplary embodiment, color measurement portions are printed at a predetermined position outside the print area (outside the finishing dimension) of the image that is printed in response to a print request.

Here, the predetermined position is a position determined by the position where the colorimeter 22 is set, specifically, a position on a recording medium that passes through a range in which the colorimeter 22 is capable of measuring color. For example, in a case where the image illustrated in FIG. 5 is transported from the left to the right, the color measurement portions arranged in a line sequentially pass through the color measurement range of the colorimeter 22, and the colors thereof are measured.

The color measuring unit 110 measures the colors of color measurement portions printed on a recording medium. In this exemplary embodiment, the color measuring unit 110 obtains L*a*b* values of the color measurement portions through color measurement using a spectral colorimeter. Alternatively, plural colorimeters 22 may be provided, and the color measuring unit 110 may obtain measured color values measured by the plural colorimeters 22, and may adopt the average value thereof as a measured color value.

The image evaluating unit 112 evaluates an image printed in response to a print request, on the basis of differences in color between measured color values obtained by the color measuring unit 110 about color measurement portions printed on a recording medium and reference values of color measurement of the color measurement portions stored in the reference data memory 106. A difference in color between a measured color value and a reference value is a difference calculated on the basis of the measured color value and the reference value, and includes a difference in hue, a difference in chroma, and a difference in lightness, as well as a difference in color.

In this exemplary embodiment, the image evaluating unit 112 evaluates whether or not an image printed in response to a print request satisfies quality requirements that are based on a predetermined standard. If a difference in color between a measured color value and a reference value is smaller than or equal to a predetermined threshold, the image evaluating unit 112 evaluates that the image satisfies predetermined quality requirements. If a difference in color between a measured color value and a reference value exceeds the predetermined threshold, the image evaluating unit 112 evaluates that the image does not satisfy the predetermined quality requirements.

Now, a detailed description will be given of an example of a case where the image evaluating unit 112 evaluates whether or not an image printed in response to a print request satisfies the standard of Japan Color.

The following condition is to be satisfied to satisfy the standard of Japan Color: regarding color differences ΔE between measured color values and reference values for the predetermined 54 types of color chips, the maximum value among the color differences ΔE for the 54 types is smaller than or equal to a threshold of 6, and the average value of the color differences ΔE for the 54 types is smaller than or equal to a threshold of 3.

Here, it is assumed that the measured color value of a certain color measurement portion is (L*, a*, b*), and that the reference value for this color measurement portion is (L*t, a*t, b*t). In this case, a color difference ΔE is expressed by the following equation (1). ΔL* represents a difference between L* and L*t, Δa* represents a difference between a* and a*t, and Δb* represents a difference between b* and b*t.

$$\Delta E = \sqrt{(\Delta L^*)^2 + (\Delta a^*)^2 + (\Delta b^*)^2} \quad (1)$$

The image evaluating unit 112 calculates the color differences ΔE in individual color measurement portions on the basis of the measured color values of the 54 types of color measurement portions on the recording medium on which the composite image illustrated in FIG. 5 is printed, and the reference values corresponding to the individual color measurement portions read out from the reference data memory 106, and determines whether or not the above-described condition of Japan Color is satisfied.

If the above-described condition of Japan Color is satisfied, the image evaluating unit 112 evaluates that the image printed on the recording medium satisfies the standard of Japan Color. On the other hand, if the above-described condition of Japan Color is not satisfied, the image evaluating unit 112 evaluates that the image printed on the recording medium does not satisfy the standard of Japan Color.

In Japan Color, the following condition is to be further satisfied to ensure the quality that is higher than the quality ensured by the foregoing condition: among the predetermined 54 types of color chips, each of hue differences ΔH in 6 types of color chips related to gray balance (specifically, No. 48 to No. 53 illustrated in FIG. 6) is 1.5 or less. The image evaluating unit 112 may employ this condition for evaluation about Japan Color.

A hue difference ΔH is calculated in the following manner on the basis of a chroma difference ΔC.

$$\Delta C = \sqrt{(a^*)^2 + (b^*)^2} - \sqrt{(a^*t) + (b^*t)^2} \qquad (2)$$

$$\Delta H = \sqrt{(\Delta a^*)^2 + (\Delta b^*)^2 - (\Delta C)^2} \qquad (3)$$

A description has been given of the case of evaluating whether or not the standard of Japan Color is satisfied. Also for another standard selected by the selecting unit 102, such as UGRA/Fogra or IDAlliance, the image evaluating unit 112 evaluates whether or not the standard is satisfied.

On the basis of an image evaluation result generated by the image evaluating unit 112, the output unit 114 determines an output location of a recording medium. In this exemplary embodiment, the output location of a recording medium on which an image is printed varies depending on whether or not quality requirements that are based on a predetermined standard selected by the selecting unit 102 are satisfied. Specifically, the output unit 114 outputs, to a first output location, a recording medium on which an image evaluated as satisfying the quality requirements that are based on the predetermined standard is printed, and outputs, to a second output location, a recording medium on which an image evaluated as not satisfying the quality requirements that are based on the predetermined standard is printed.

The first output location and the second output location may be different output trays, or may be different output locations on the same output tray.

The printing stopping unit 116 stops print processing of the image processing device 6 on the basis of an image evaluation result generated by the image evaluating unit 112. In this exemplary embodiment, the printing stopping unit 116 stops print processing if the image evaluating unit 112 evaluates that quality requirements that are based on a predetermined standard selected by the selecting unit 102 are not satisfied.

Here, the printing stopping unit 116 stops print processing if the image evaluating unit 112 evaluates a predetermined number of times, for example, consecutive M times (M is an integer of 1 or more), that quality requirements that are based on a predetermined standard are not satisfied. In a case where M=1, the printing stopping unit 116 stops print processing at the time when printing not satisfying the quality requirements that are based on the predetermined standard occurs. For example, even if the image evaluating unit 112 evaluates once that the quality requirements are not satisfied, if the operation of the apparatus becomes stable after a certain number of printing operations and the quality requirements are satisfied again, and if the number of times the image evaluating unit 112 evaluates that the quality requirements are not satisfied until the quality requirements are satisfied is smaller than M, print processing is continued.

The printing stopping unit 116 may stop print processing if the image evaluating unit 112 evaluates, M times in total, that the quality requirements that are based on the predetermined standard are not satisfied.

The evaluation result output unit 118 outputs information about an evaluation result generated by the image evaluating unit 112. The evaluation result may be output to the UI device 10 or may be printed out. In a case where the evaluation result is printed out, information about the evaluation result may be output after all pages to be printed in response to a print request have been printed, or may be output while printing is being performed in response to a print request.

For example, the evaluation result output unit 118 may output information about an image that has been evaluated by the image evaluating unit 112 as not satisfying quality requirements that are based on a predetermined standard.

Figure 7:
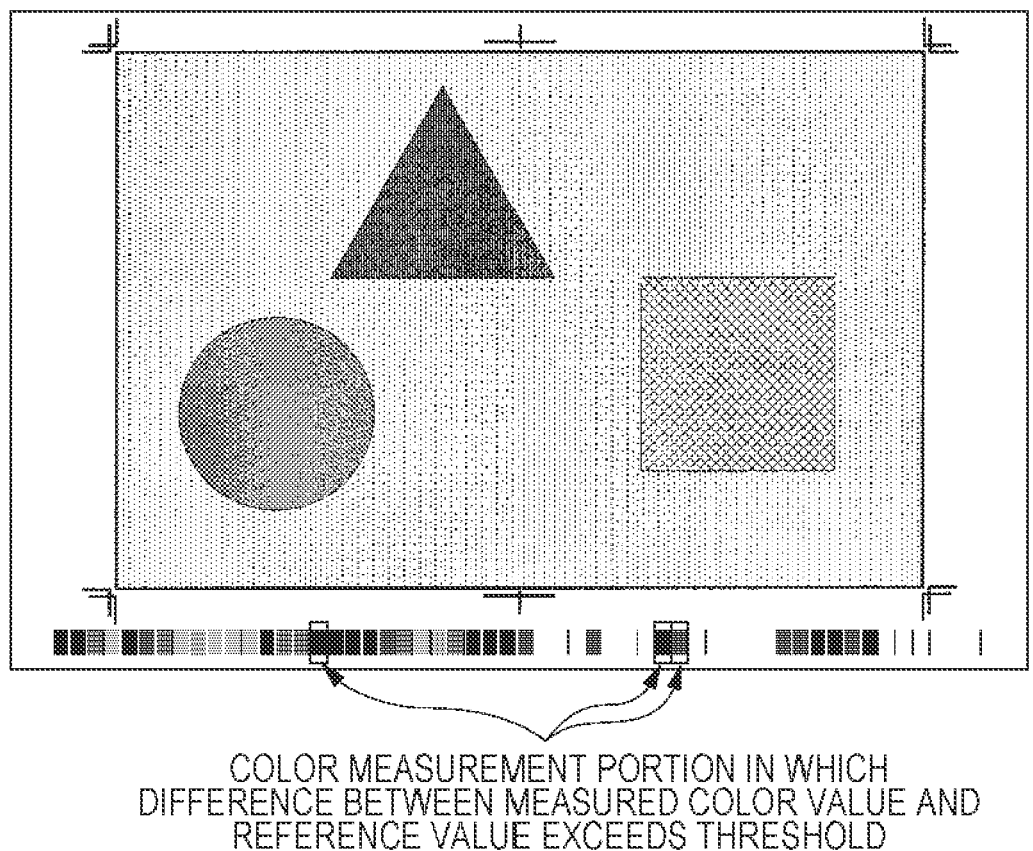
FIG. 7 is a schematic diagram illustrating an output example of information about an image evaluated as not satisfying quality requirements that are based on a predetermined standard.

FIG. 7 is a schematic diagram illustrating an output example of information about an image that has been evaluated as not satisfying quality requirements that are based on a predetermined standard. FIG. 7 illustrates an output example that clearly shows color measurement portions in which a difference in color between a measured color value and a reference value exceeds a threshold.

As illustrated in FIG. 7, the evaluation result output unit 118 may output, together with an image that has been evaluated as not satisfying quality requirements that are based on a predetermined standard (a composite image of an image based on a print request and an image of color measurement portions), frames surrounding the color measurement portions in which a difference in color between a measured color value and a reference color value exceeds a threshold. Accordingly, the color measurement portions that are the causes of evaluation, performed by the image evaluating unit 112, that the image does not satisfy the quality requirements that are based on the predetermined standard, are specified.

Alternatively, the evaluation result output unit 118 may output a warning when the image evaluating unit 112 evaluates that an image does not satisfy quality requirements that are based on a predetermined standard. The warning may be displayed on the UI device 10 or may be printed out. Alternatively, a warning sound may be generated, or a notice may be transmitted to another apparatus.

Alternatively, the evaluation result output unit 118 may output, onto a page printed in response to a print request, the number of pages that satisfy predetermined quality requirements and the number of pages that do not satisfy the predetermined quality requirements, or information indicating a page that satisfies the predetermined quality requirements or a page that does not satisfy the predetermined quality requirements.

Figure 8:
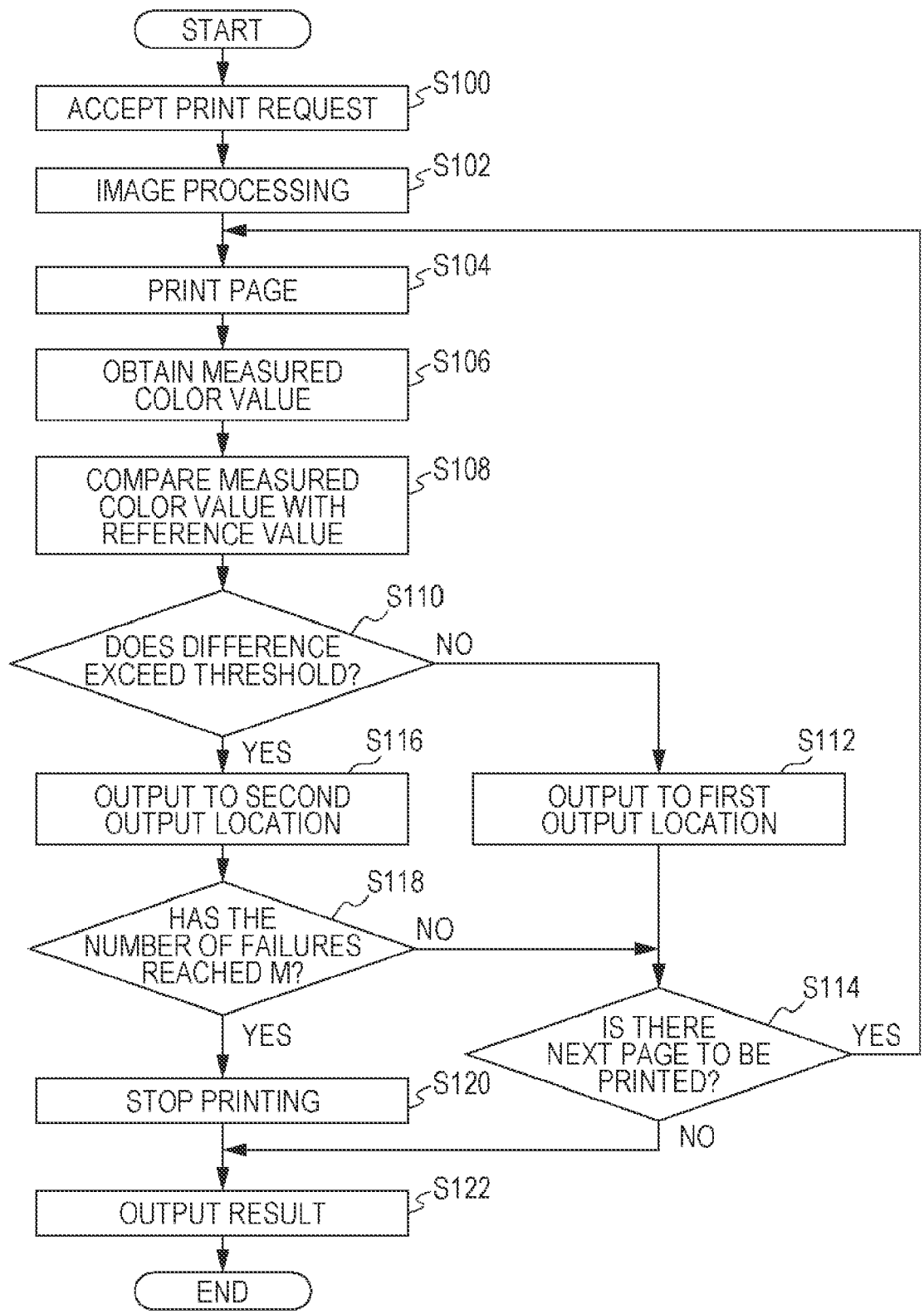
FIG. 8 is a flowchart illustrating an example of the operation performed by the image forming apparatus according to the first exemplary embodiment.

FIG. 8 is a flowchart illustrating an example of the operation performed by the image forming apparatus 2 according to this exemplary embodiment.

In step S100, the print request accepting unit 100 accepts a print request (print job). The selecting unit 102 selects a standard to be used for evaluation by the image evaluating unit 112.

In step S102, image processing is performed for the print request accepted in step S100, under the control performed by the image processing controller 104. In this step, an image of color measurement portions is combined with an image that is based on the print request.

In step S104, a composite image obtained in step S102 is printed by the printing unit 108.

In step S106, the color measuring unit 110 obtains, for each of the color measurement portions on the composite image printed in step S104, L*a*b* values measured by the spectral colorimeter.

In step S108, the image evaluating unit 112 compares, for each of the color measurement portions, a measured color value (L*, a*, b*) obtained in step S106 with a reference value for the measured color value (L*t, a*t, b*t), thereby calculating the difference between the two values.

The comparison between the measured color value (L*, a*, b*) and the reference value (L*t, a*t, b*t) is performed in a predetermined manner in accordance with the standard selected by the selecting unit 102. For example, in a case where Japan Color is selected by the selecting unit 102, the comparison is performed using the color difference ΔE, as described above.

In step S110, the image evaluating unit 112 determines whether or not the difference in color calculated in step S108 exceeds a threshold that is predetermined in accordance with the standard selected by the selecting unit 102.

For example, in a case where Japan Color is selected by the selecting unit 102, the image evaluating unit 112 performs determination on the basis of the maximum color difference (the threshold is 6) for 54 types of color measurement portions and the average color difference (the threshold is 3) for the 54 types of color measurement portions.

If the difference in color is smaller than or equal to the predetermined threshold, the image evaluating unit 112 evaluates that the image printed in step S104 satisfies quality requirements that are based on the predetermined standard, and the process proceeds to step S112. On the other hand, if the difference in color exceeds the predetermined threshold, the image evaluating unit 112 evaluates that the image printed in step S104 does not satisfy the quality requirements that are based on the predetermined standard, and the process proceeds to step S116.

In step S112, the output unit 114 outputs the recording medium on which printing is performed in step S104 to the first output location.

If there is a next page to be printed in response to the print request, a positive determination result (YES) is obtained in step S114, and the process returns to step S104. If all the pages that are based on the print request have been printed, a negative determination result (NO) is obtained in step S114, and the process proceeds to step S122.

On the other hand, in step S116, the recording medium on which the image evaluated as not satisfying the quality requirements that are based on the predetermined standard is printed is output to the second output location.

In step S118, the printing stopping unit 116 determines whether or not the consecutive number of times it is evaluated that the quality requirements that are based on the predetermined standard are not satisfied has reached a predetermined number M. If the consecutive number of times has reached M, the process proceeds to step S120. If the consecutive number of times has not reached M, the process proceeds to step S114.

In step S120, the printing stopping unit 116 performs control to stop print processing.

In step S122, the evaluation result output unit 118 outputs information about the evaluation result generated by the image evaluating unit 112. The output from the evaluation result output unit 118 may be performed any time while the image forming apparatus 2 is performing printing.

In the above-described flowchart, the flow of printing a next page after outputting a recording medium has been described for convenience, but individual operations including printing, color measurement, image evaluation, and output may be performed in parallel in the image forming apparatus 2.

The first exemplary embodiment has been described above. In the first exemplary embodiment, a standard selected by the selecting unit 102 may be set by a user.

FIG. 9 is a plan view illustrating an example of a standard setting screen displayed on the UI device 10. As illustrated in FIG. 9, a user is capable of determining a standard for each color chip (for each color measurement portion). In the example illustrated in FIG. 9, the standard of check 1 (a color difference ΔE between a measured color value and a reference value is 6 or less, and a hue difference ΔH is 4 or less) is applied to the color measurement portions of color chip numbers 1 and 2. Also, in the example illustrated in FIG. 9, the standard of check 2 (a color difference ΔE between a measured color value and a reference value is 3 or less) is applied to the color measurement portions of color chip numbers 3 and 4. In this way, the standard to be applied may be set for each color measurement portion. Further, the value of a threshold, what difference in color is to be evaluated, and so forth may be set.

In the example illustrated in FIG. 9, a standard is set for color chips for which data for generating color measurement portions and reference values of color measurement for the color measurement portions are stored. Alternatively, data about color measurement portions may be set by a user.

FIG. 10 is a plan view illustrating an example of a setting screen used for setting a standard and color measurement portions.

As illustrated in FIG. 10, a user may set CMYK values for generating individual color measurement portions, and L*a*b* values which correspond to reference values for color measurement of color measurement portions printed on the basis of the CMYK values.

Further, a standard generated from AND conditions of plural standards may be set. If this standard is satisfied, the quality that satisfies all of the plural standards is ensured.

Next, a second exemplary embodiment of the present invention will be described. In the above-described first exemplary embodiment, if a difference in color between a measured color value and a reference value for a color measurement portion exceeds a predetermined threshold, the image evaluating unit 112 determines that an image that is based on a print request does not satisfy quality requirements that are based on a predetermined standard. At this time, determination is performed regardless of whether or not the color of the color measurement portion that is a cause of exceeding a threshold is used in the image that is based on a print request. However, in a case where monochrome printing is performed by the printing unit 108, for example, a color measurement result about a color that is not used in monochrome printing does not substantially affect the quality.

Accordingly, in the second exemplary embodiment, it is evaluated whether or not quality requirements are satisfied, on the basis of a measured color value of a color measurement portion corresponding to a color used in an image that is printed in response to a print request, among plural color measurement portions to be printed. Accordingly, if a difference between a measured color value of a color measurement portion corresponding to a color used in an image that is printed in response to a print request, among plural color measurement portions to be printed, and a reference value for the measured color value is smaller than or equal to a predetermined threshold, it is evaluated that the image printed in response to a print request satisfies quality requirements that are based on a predetermined standard.

Figure 11:
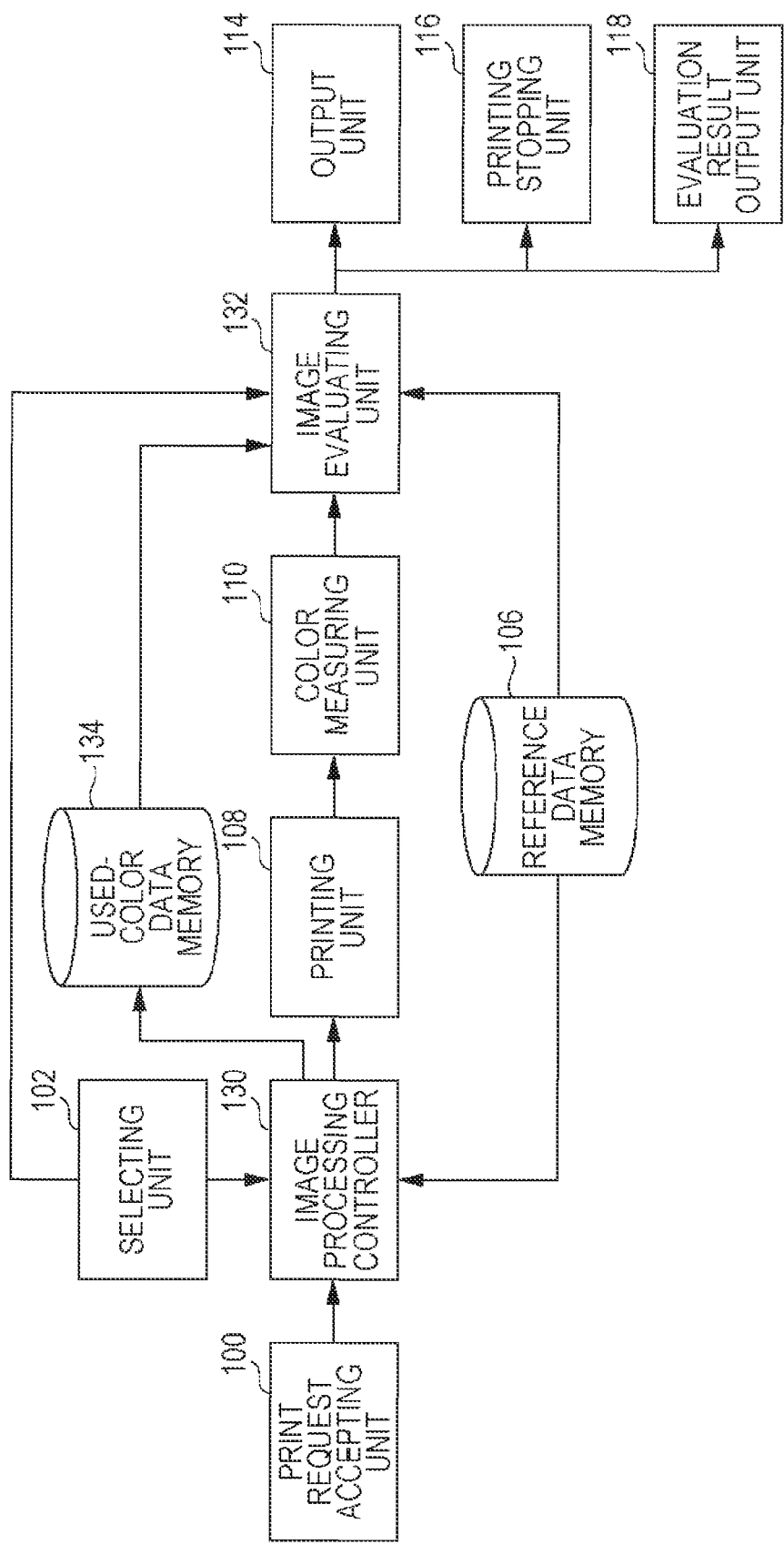
FIG. 11 is a block diagram illustrating the functional configuration of an image forming apparatus according to a second exemplary embodiment, which is implemented by executing a program.

FIG. 11 is a block diagram illustrating the functional configuration of an image forming apparatus 2 according to the second exemplary embodiment, which is implemented by executing a program. Part or the whole of the configuration illustrated in FIG. 11 may be implemented by hardware, such as an ASIC or an FPGA.

As illustrated in FIG. 11, the image forming apparatus 2 according to the second exemplary embodiment is different from the one according to the first exemplary embodiment in that the image processing controller 104 is replaced with an image processing controller 130, the image evaluating unit 112 is replaced with an image evaluating unit 132, and a used-color data memory 134 is added.

The image processing controller 130 has, in addition to the function of the image processing controller 104, a function of controlling the image processing device 6 to obtain data of colors to be used in individual pages (for example, CMYK values) from raster data that is generated through RIP processing for a print request, and store the data in the used-color data memory 134.

The used-color data memory 134 stores, for each page to be printed in response to a print request, data of colors to be used.

The image evaluating unit 132 evaluates, like the image evaluating unit 112, whether or not an image printed in response to a print request satisfies quality requirements that are based on a predetermined standard, on the basis of a difference in color between a measured color value that is obtained by the color measuring unit 110 and that is about a color measurement portion printed on a recording medium, and a reference value of color measurement for the color measurement portion stored in the reference data memory 106. Note that the image evaluating unit 132 evaluates whether or not quality requirements are satisfied on the basis of a difference in color between a measured color value of a color measurement portion of a color corresponding to a color used in a target page to be evaluated, and a reference value for the measured color value. The image evaluating unit 132 does not use, for evaluation, a difference in color between a measured color value of a color measurement portion of a color not corresponding to a color used in a target page to be evaluated, and a reference value for the measured color value.

Now, the correspondence between a color used in a page and the color of a color measurement portion will be described. "A color used in a page corresponds to the color of a color measurement portion" includes not only "a color used in a page is the same as the color of a color measurement portion" but also "the difference between a color used in a page and the color of a color measurement portion is within a predetermined range". A difference in color is calculated, for example, by comparing CMYK values of a color measurement portion stored in the reference data memory 106 with CMYK values stored in the used-color data memory 134. The predetermined range of a difference in color may be set by a user.

When evaluating an image, the image evaluating unit 132 determines a color used in a target page to be evaluated, by using the data of colors stored in the used-color data memory 134, and evaluates whether or not quality requirements are satisfied on the basis of the measured color value of the color measurement portion corresponding to the color used in the image of the target page.

For example, in a case where the standard of Japan Color is selected as a standard by the selecting unit 102, the image evaluating unit 132 evaluates that the standard of Japan Color is satisfied if the maximum value of the color difference ΔE is 6 or less and the average value of the color difference ΔE is 3 or less regarding K types of color measurement portions (K is an integer of 1 or more and 54 or less) corresponding to the colors used in a page image among 54 types of color measurement portions defined by the standard of Japan Color.

Figure 12:
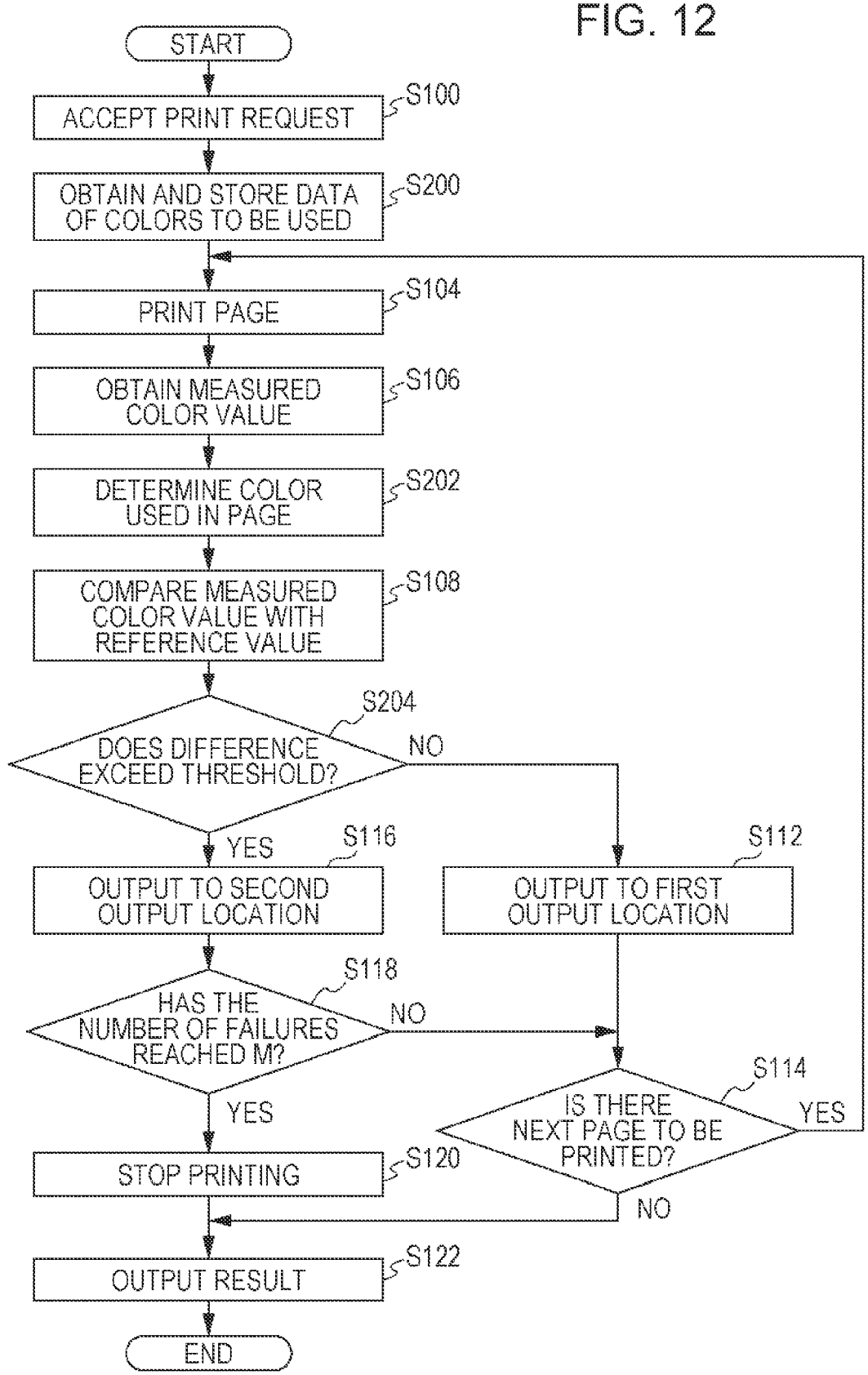
FIG. 12 is a flowchart illustrating an example of the operation performed by the image forming apparatus according to the second exemplary embodiment.

FIG. 12 is a flowchart illustrating an example of the operation performed by the image forming apparatus 2 according to the second exemplary embodiment. The flowchart illustrated in FIG. 12 is different from the one illustrated in FIG. 8 in that step S102 is replaced with step S200, step S110 is replaced with step S204, and step S202 is added between steps S106 and S108. Hereinafter, a description will be given of the part different from the flowchart illustrated in FIG. 8.

In step S200, data of colors to be used in individual pages that are to be printed in response to a print request is obtained, and the data is stored in the used-color data memory 134.

In step S202, the image evaluating unit 112 determines a color used in a target page to be evaluated, on the basis of the data of colors stored in the used-color data memory 134.

In step S204, the image evaluating unit 112 evaluates whether or not an image of the target page to be evaluated satisfies quality requirements, on the basis of the measured color value of the color measurement portion corresponding to the color used in the image.

Note that, in step S104, a color measurement portion of the color corresponding to a color used in the image of the page may be printed, and a color measurement portion of the color not corresponding to a color used in the image of the page may not be printed.

The second exemplary embodiment has been described above. Alternatively, the following configuration may be employed.

Even if a difference in color between a measured color value of a color measurement portion used for evaluation and a reference value for the measured color value exceeds a predetermined threshold, if the percentage of the color corresponding to the color of the color measurement portion in an image printed in response to a print request is lower than or equal to a predetermined percentage, the image evaluating unit 132 may evaluate that the image printed in response to the print request satisfies quality requirements.

For example, it is assumed that the threshold of the color difference ΔE in each color measurement portion is 5 in a certain standard. If the color difference ΔE in a certain color measurement portion is 6 and if the percentage of the color corresponding to the certain color measurement portion used in the page is X percent or less, the image evaluating unit 132 may evaluate that the page satisfies the standard.

In this case, for example, in the flowchart illustrated in FIG. 12, it may be determined after step S204 whether or not the percentage of the color corresponding to the color of a color measurement portion in which the color difference ΔE exceeds the threshold in an image printed in response to a print request exceeds a predetermined percentage. If the percentage does not exceed the predetermined percentage, the process proceeds to step S112. If the percentage exceeds the predetermined percentage, the process proceeds to step S116.

The evaluation result output unit 118 may output, by using the data of colors stored in the used-color data memory 134, a result that specifies the area of the color corresponding to a color measurement portion in which a difference in color between a measured color value and a reference value exceeds a predetermined threshold in the image evaluated by the image evaluating unit 132 as not satisfying quality requirements that are based on a predetermined standard.

Figure 13:
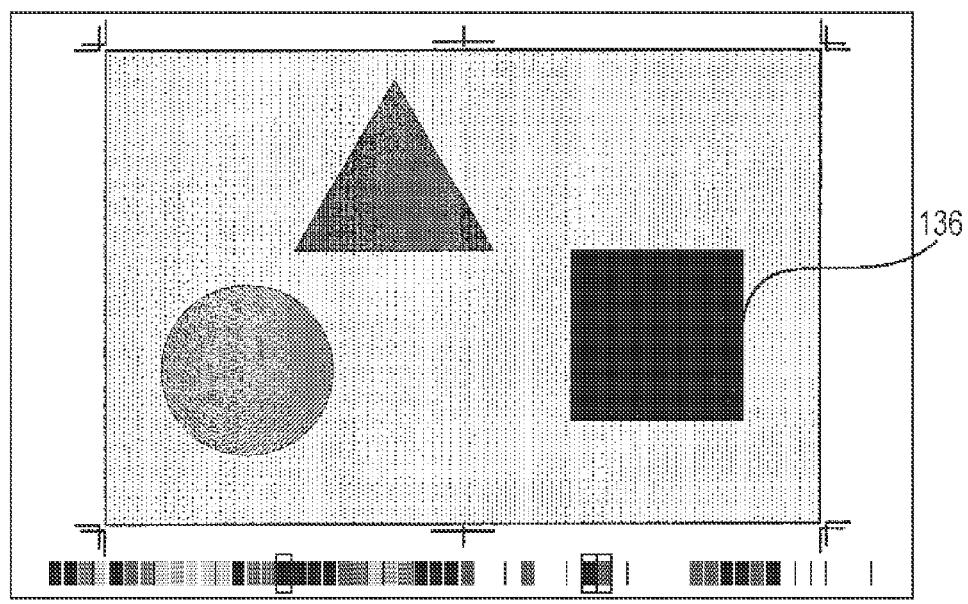
FIG. 13 is a schematic diagram illustrating an output example of information about an image evaluated as not satisfying quality requirements that are based on a predetermined standard.

FIG. 13 is a schematic diagram illustrating an output example of information about an image evaluated as not satisfying quality requirements that are based on a predetermined standard.

As illustrated in FIG. 13, in an image evaluated as not satisfying quality requirements that are based on a predetermined standard, an area 136 is specified in which a color difference from a color measurement portion that is a cause of the evaluation is within a predetermined range. The color difference is calculated by, for example, comparing the CMYK values of the color measurement portion stored in the reference data memory 106 with the CMYK values stored in the used-color data memory 134. The above-described predetermined range for color difference may be set by a user. The area 136 may be specified by, for example, coloring it with a warning color, as illustrated in FIG. 13. The method for specifying the area is not limited thereto, and any method may be used as long as the area is specified, for example, the coordinates of the area may be output.

In addition, the evaluation result output unit 118 may perform such display in another exemplary embodiment, as well as in the second exemplary embodiment.

Next, a third exemplary embodiment of the present invention will be described. In the third exemplary embodiment, adjustment is performed in color conversion processing on the basis of a color measurement result of color measurement portions printed by the printing unit 108.

Figure 14:
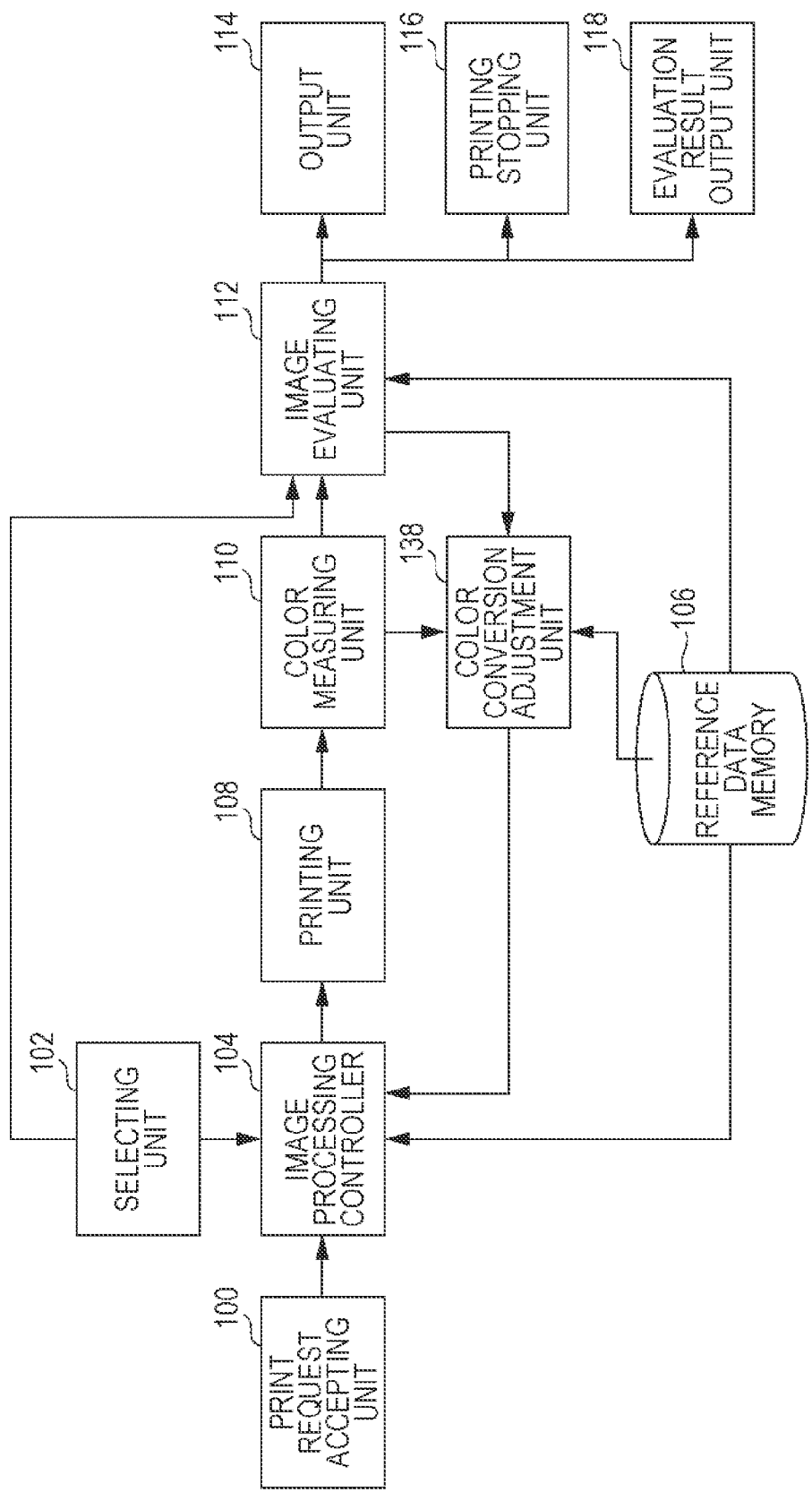
FIG. 14 is a block diagram illustrating the functional configuration of an image forming apparatus according to a third exemplary embodiment, which is implemented by executing a program.

FIG. 14 is a block diagram illustrating the functional configuration of an image forming apparatus 2 according to the third exemplary embodiment, which is implemented by executing a program. Part or the whole of the configuration illustrated in FIG. 14 may be implemented by hardware, such as an ASIC or an FPGA.

As illustrated in FIG. 14, the image forming apparatus 2 according to the third exemplary embodiment is different from the one according to the first exemplary embodiment in that a color conversion adjustment unit 138 is added. The following function according to the third exemplary embodiment may be added to the second exemplary embodiment.

The color conversion adjustment unit 138 performs adjustment for color conversion applied to a print request in the image processing device 6, on the basis of a measured color value of a color measurement portion obtained by the color measuring unit 110 and a reference value of color measurement of the color measurement portion stored in the reference data memory 106.

Specifically, the color conversion adjustment unit 138 creates a table in which input values (CMYK values) about color measurement portions input in color conversion processing are associated with measured color values (L*a*b* values) obtained by the color measuring unit 110 for the input values. On the basis of the correspondence between the input values and measured color values, the color conversion adjustment unit 138 creates a correction table used for performing correction so that a measured color value with respect to an input value becomes a target value (a reference value L*a*b* of color measurement stored in the reference data memory 106). The color conversion adjustment unit 138 sets the created correction table in the image processing device 6.

In the image processing device 6, color conversion processing is performed using the correction table created by the color conversion adjustment unit 138.

In this exemplary embodiment, the color conversion adjustment unit 138 does not perform adjustment for color conversion until a predetermined period has elapsed from the start of print processing performed by the image forming apparatus 2. Just after the start of print processing performed by the image forming apparatus 2, the state of the apparatus, for example, the temperature of the fixing device 20, may be unstable. If adjustment for color conversion is performed under such an unstable condition, it may be impossible to obtain an expected adjustment result. In this exemplary embodiment, adjustment for color conversion is performed after a predetermined number of pages have been printed after the start of printing.

Alternatively, the color conversion adjustment unit 138 may be configured to perform adjustment for only color conversion of a primary color of CMYK. For example, if the standard of Japan Color is selected by the selecting unit 102, color measurement portions of 54 types of colors are printed. However, 54 is a small number compared to 900 to 1500 types used for creating a profile. In this way, the color conversion adjustment unit 138 may perform adjustment for only a primary color in order to perform adjustment for color conversion using a limited number of color measurement portions.

Alternatively, the adjustment may be limited to adjustment of gray balance or adjustment of a skin color. Alternatively, the adjustment may be limited to adjustment of the color corresponding to a color measurement portion in which the color difference ΔE is the largest among the color differences ΔE calculated for color measurement portions. Of course, adjustment may be performed to improve the average of the color differences ΔE of the individual color measurement portions without providing limitation. Which adjustment is to be performed may be selected by a user.

Figure 15:
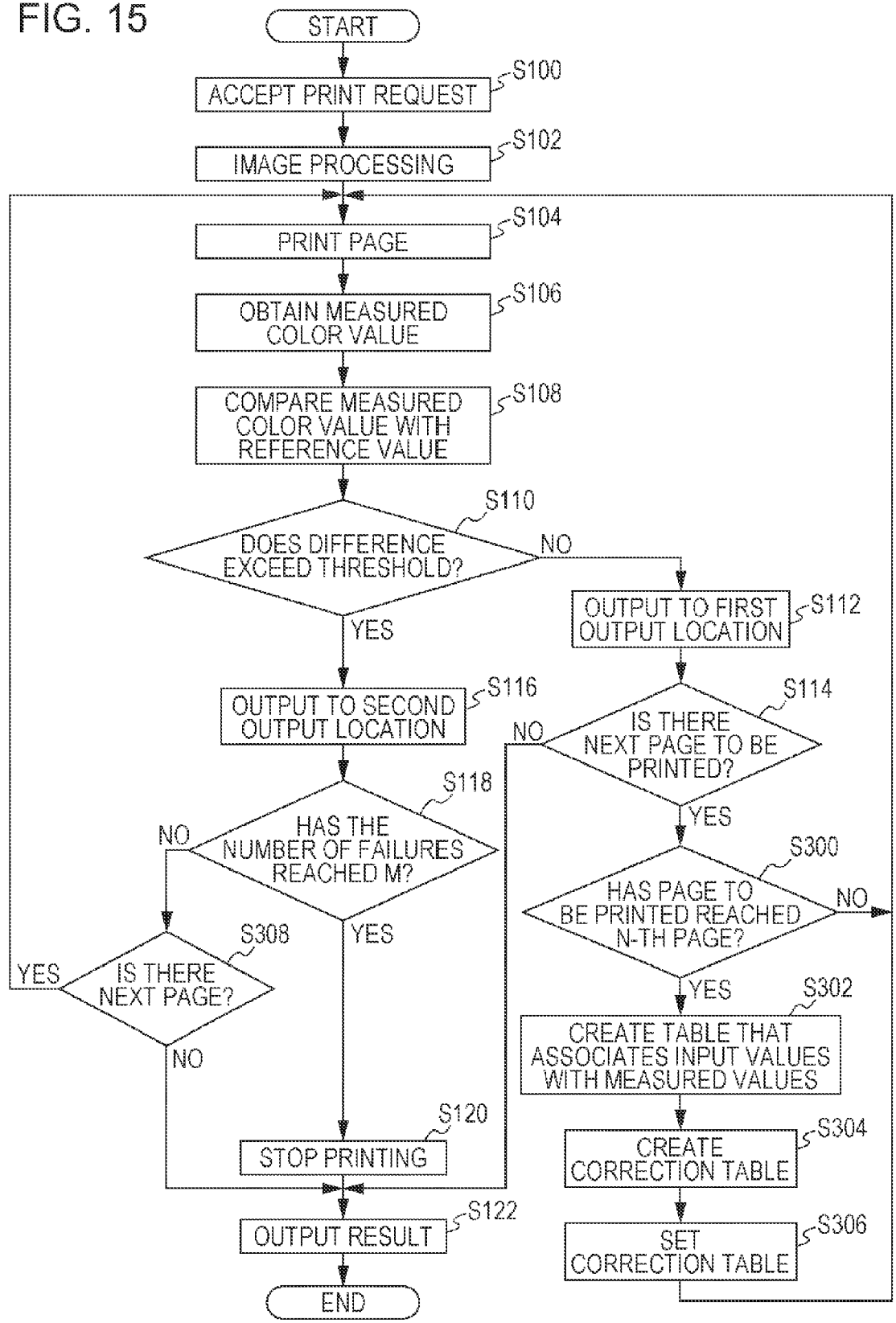
FIG. 15 is a flowchart illustrating a first example of the operation performed by the image forming apparatus according to the third exemplary embodiment.

FIG. 15 is a flowchart illustrating a first example of the operation performed by the image forming apparatus 2 according to the third exemplary embodiment. In the flowchart illustrated in FIG. 15, steps S100 to S110 are the same as those in the flowchart illustrated in FIG. 8. Thus, a description will be given of the subsequent steps.

If it is determined in step S110 that a difference in color does not exceed a predetermined threshold, a recording medium is output to a first output location in step S112, and it is determined in step S114 whether or not there is a next page to be printed in response to a print request. If there is a next page, the process proceeds to step S300. If all pages have been printed, the process proceeds to step S122.

In step S300, it is determined whether or not the page to be printed in response to the print request has reached the N-th page. If the page is before the N-th page, the process returns to step S104. If the page has reached the N-th page, the process proceeds to step S302, and adjustment for color conversion is performed.

In step S302, the color conversion adjustment unit 138 creates a table in which input values about color measurement portions input in color conversion processing are associated with measured color values for the input values.

In step S304, the color conversion adjustment unit 138 creates a correction table on the basis of the table created in step S302.

In step S306, the color conversion adjustment unit 138 sets the created correction table in the image processing device 6, and the process returns to step S104. Thereafter, printing is performed through color conversion processing to which the correction table is applied.

In this flowchart, adjustment for color conversion is performed if a positive determination result (YES) is obtained in step S114. However, adjustment for color conversion may be performed regardless of whether or not there is a next page. In addition, after the N-th page, it is not necessary to perform adjustment for color conversion every time a negative determination result (NO) is obtained in step S110, but the adjustment may be performed at a certain timing.

On the other hand, if it is determined in step S110 that a difference in color exceeds the predetermined threshold, a recording medium on which an image evaluated as not satisfying quality requirements that are based on a predetermined standard is printed is output to a second output location in step S116. In step S118, it is determined whether or not the consecutive number of times it is evaluated that the quality requirements that are based on the predetermined standard are not satisfied has reached the predetermined number M.

If the consecutive number of times has reached M, the process proceeds to step S120, where print processing is stopped. Subsequently, in step S122, information about the evaluation result generated by the image evaluating unit 112 is output.

On the other hand, if it is determined in step S118 that the consecutive number of times has not reached M, the process proceeds to step S308.

In step S308, it is determined whether or not there is a next page to be printed in response to the print request. If there is a next page, the process returns to step S104. If all pages have been printed, the process proceeds to step S122.

As described above, in the flowchart illustrated in FIG. 15, adjustment for color conversion is not performed until the page printed in response to a print request reaches the N-th page. Here, a specific value of N may be measured and determined.

For example, a measurement mode for obtaining a specific value of N may be provided. In the measurement mode, N is set on the basis of a variable value of a predetermined target to be measured in printing that is consecutively performed. For example, images (color measurement portions) that are based on color data obtained from the reference data memory 106 are consecutively printed, and the number of consecutively printed pages at the time when the variable value of a measured color value of a color measurement portion becomes smaller than a predetermined value is stored as a specific value of N.

Here, on individual pages that are consecutively printed, an image may be printed in addition to an image of color measurement portions. For example, a certain image specified by a user may be further printed, or an image having an image density specified by a user (for example, a rectangular image having a specified image density) may be further printed. The density of an image becomes unstable due to a change in temperature of the fixing device 20 just after the start of print processing performed by the image forming apparatus 2, and the density of the image is affected by the image density, that is, the amount of toner to be fixed, as well as the type of recording medium. Thus, printing not only color measurement portions but also another image enables a specific value of N to be obtained more appropriately.

Instead of an image density specified by a user, an image density calculated on the basis of the history of printing by the image forming apparatus 2 may be used. For example, a rectangular image of an average image density of the last n pages (n is a predetermined value) formed by the image forming apparatus 2 may be printed to measure the value of N.

Also, in the measurement mode, instead of the number of consecutively printed pages at the time when the variable value of a measured color value of a color measurement portion becomes smaller than a predetermined value, the number of consecutively printed pages at the time when the change in temperature of the fixing device 20 becomes smaller than a predetermined value may be determined as the value of N.

The value of N may be determined for each type of recording medium (for example, an item, the thickness of a sheet, or the size of a sheet), and the flowchart illustrated in FIG. 15 may be performed by using the value of N corresponding to the recording medium to be used. Also, in the case of calculating an image density on the basis of the history of printing performed by the image forming apparatus 2, the image density may be calculated for each type of recording medium.

Figure 16:
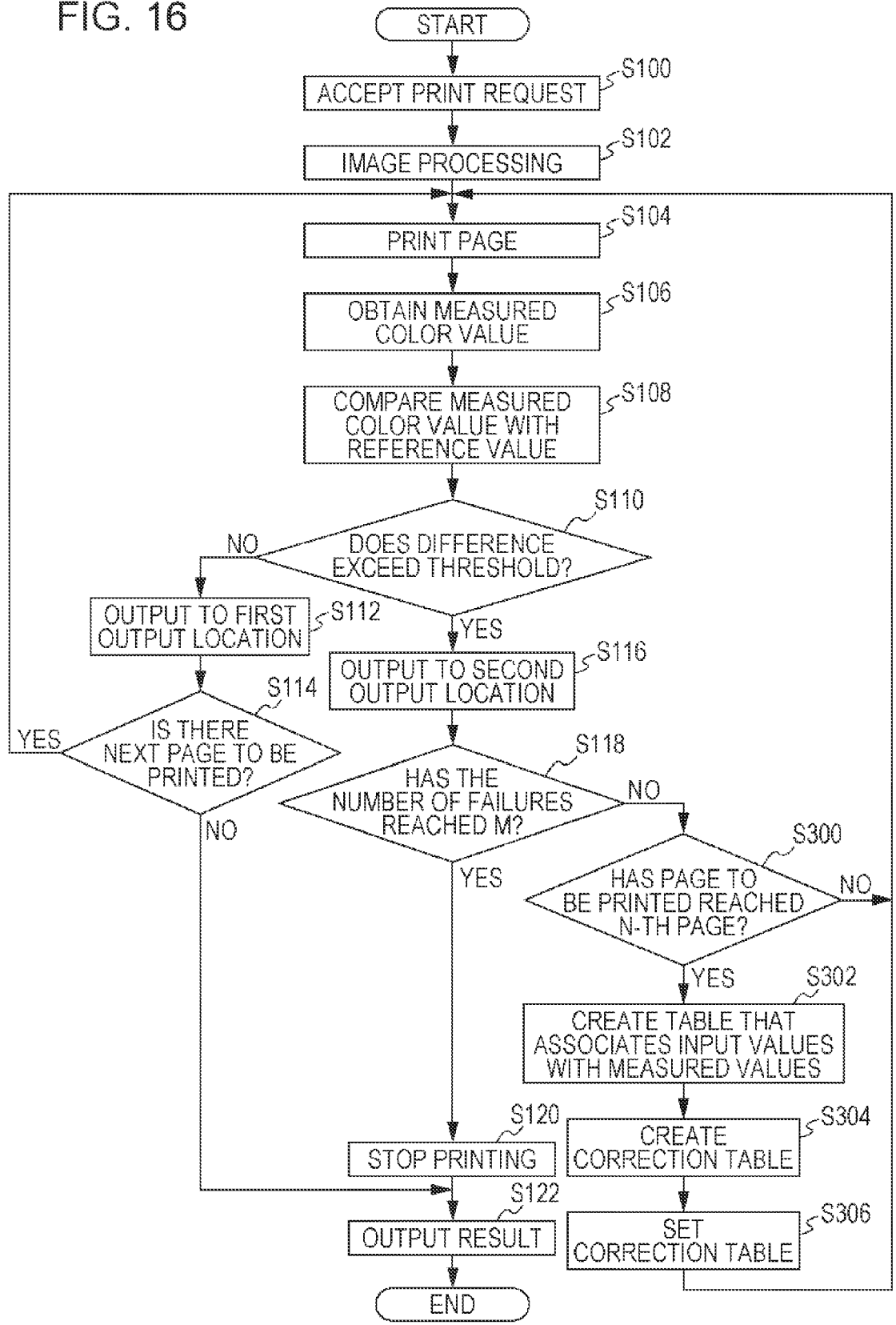
FIG. 16 is a flowchart illustrating a second example of the operation performed by the image forming apparatus according to the third exemplary embodiment.

FIG. 16 is a flowchart illustrating a second example of the operation performed by the image forming apparatus 2 according to the third exemplary embodiment. In the flowchart illustrated in FIG. 15, if it is determined in step S110 that a difference in color does not exceed the predetermined threshold, adjustment for color conversion is performed. In the flowchart illustrated in FIG. 16, if it is determined that a difference in color exceeds the predetermined threshold, adjustment for color conversion is performed. Hereinafter, the point different from the flowchart illustrated in FIG. 15 will be described.

In the flowchart illustrated in FIG. 16, it is determined in step S114 whether or not there is a next page to be printed in response to a print request. It there is a next page, the process returns to step S104. If all pages have been printed, the process proceeds to step S122.

If it is determined in step S118 that the consecutive number of times it is evaluated that quality requirements that are based on a predetermined standard are not satisfied has reached the predetermined number M, the process proceeds to step S120. If the consecutive number of times has not reached M, the process proceeds to step S300, and adjustment of color conversion is performed.

Next, a fourth exemplary embodiment of the present invention will be described. According to the description given above, the printing unit 108 prints a composite image obtained by combining an image that is based on a print request and an image of color measurement portions. The printing unit 108 according to this exemplary embodiment prints an image that is based on a print request and an image of color measurement portions on difference pages. The functions described below in the fourth exemplary embodiment may be added to the second or third exemplary embodiment.

The printing unit 108 according to this exemplary embodiment prints, every predetermined pages P, color measurement portions on a recording medium on which an image has not been printed in response to a print request. Specifically, the printing unit 108 inserts a page on which color measurement portions are printed every time P pages of images have been printed in response to a print request.

If it is determined that a difference in color between a measured color value of a color measurement portion and a reference value does not exceed a threshold predetermined for each standard selected by the selecting unit 102, the image evaluating unit 112 evaluates that the images on the pages that have been printed before the next printing of color measurement portions is performed satisfy quality requirements that are based on the predetermined standard. On the other hand, if it is determined that a difference in color between a measured color value of a color measurement portion and a reference value exceeds a threshold predetermined for each standard selected by the selecting unit 102, the image evaluating unit 112 evaluates that the images on the pages that have been printed before the next printing of color measurement portions is performed do not satisfy quality requirements that are based on the predetermined standard.

Figure 17:
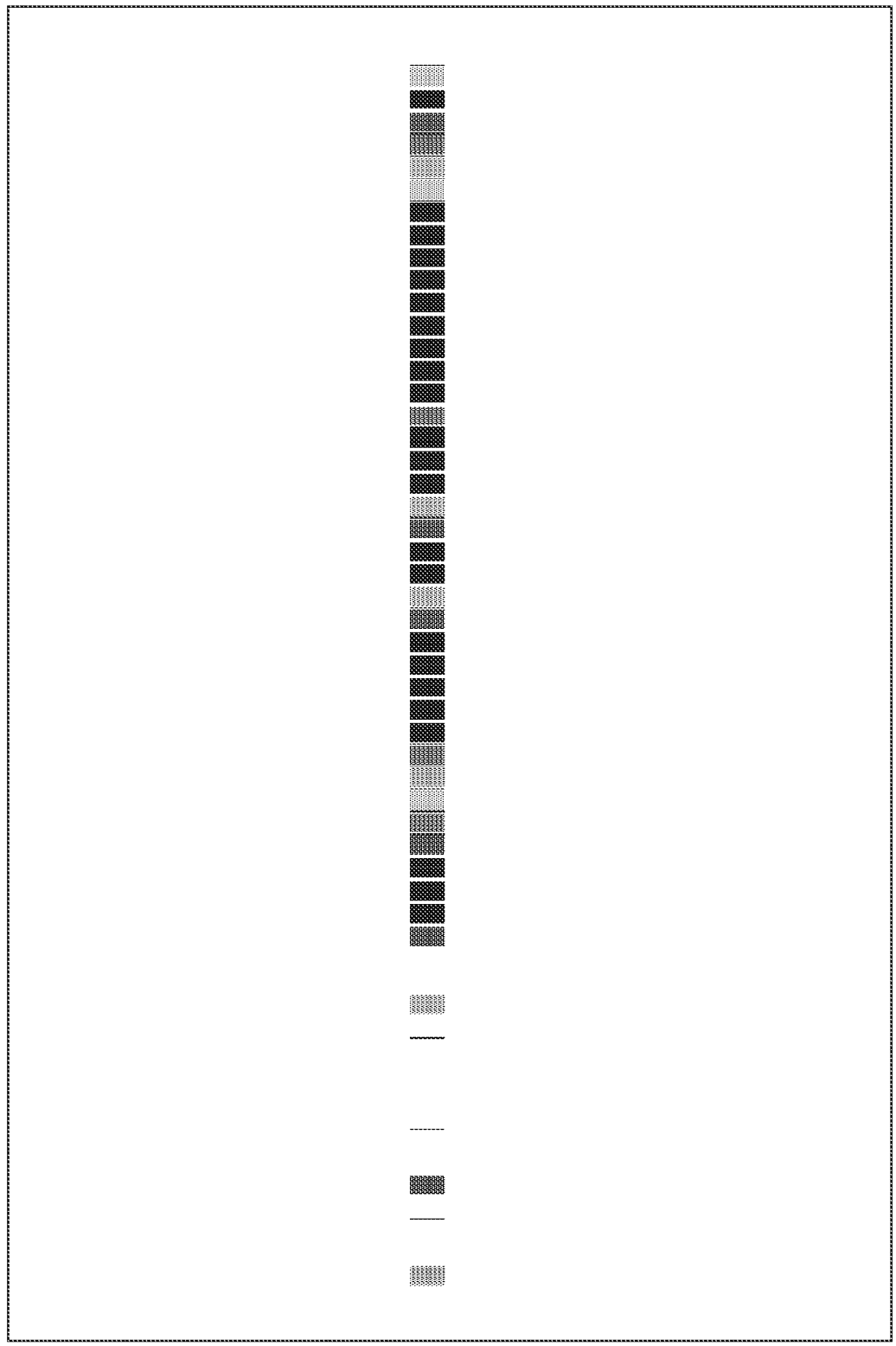
FIG. 17 is a plan view illustrating an example of a page of color measurement portions that are printed in a fourth exemplary embodiment.

FIG. 17 is a plan view illustrating an example of a page of color measurement portions that are printed in the fourth exemplary embodiment. The positions where color measurement portions are printed are determined by the position where the colorimeter 22 is set.

FIG. 18 is a flowchart illustrating an example of the operation performed by the image forming apparatus 2 according to the fourth exemplary embodiment.

In step S400, the print request accepting unit 100 accepts a print request (print job). The selecting unit 102 selects a standard that is to be used for evaluation by the image evaluating unit 112.

In step S402, image processing for the print request accepted in step S400 is performed under the control performed by the image processing controller 104. In the image processing, an image of color measurement portions is not combined with an image that is based on the print request.

In step S404, the printing unit 108 prints the color measurement portions corresponding to the standard selected by the selecting unit 102 on a recording medium, as illustrated in FIG. 17.

In step S406, the color measuring unit 110 obtains measured color values about the color measurement portions printed in step S404.

In step S408, the image evaluating unit 112 compares a measured color value obtained in step S406 with a reference value for the measured color value, thereby calculating the difference between the two values.

In step S410, the image evaluating unit 112 determines whether or not the difference in color calculated in step S408 exceeds a threshold that is predetermined for the standard selected by the selecting unit 102. If the difference in color is smaller than or equal to the predetermined threshold, the process proceeds to step S412. If the difference in color exceeds the predetermined threshold, the process proceeds to step S420.

In step S412, the printing unit 108 prints an image of a page in response to the print request. In step S414, a recording medium on which printing has been performed is output to a first output location.

In step S416, it is determined whether or not there is a next page to be printed in response to the print request. If there is a next page, the process proceeds to step S418. If there is not a next page, the process proceeds to step S432.

In step S418, it is determined whether or not images that are based on the print request have been printed on P pages since the printing of image measurement portions in step S404. If P pages haven't been printed, the process returns to step S404, and a page of color measurement portions is inserted. On the other hand, if P pages have not been printed, the process returns to step S412, and an image of a page is printed in response to the print request.

On the other hand, if it is determined in step S410 that the difference in color exceeds the predetermined threshold, the printing unit 108 prints an image of a page in response to the print request in step S420, and a recording medium on which printing has been performed is output to a second output location in step S422.

In step S424, it is determined whether or not the consecutive number of times it is determined that the difference exceeds the predetermined threshold has reached the predetermined number of times M. If the consecutive number of times has reached M, the process proceeds to step S426. If the consecutive number of time has not reached M, the process proceeds to step S428. The value of M may be 1.

In step S426, the printing stopping unit 116 performs control to stop print processing.

On the other hand, if it is determined in step S424 that the consecutive number of times has not reached M, the process proceeds to step S428 and then step S430, where operations similar to those in steps S416 and S418 are performed.

In step S432, the evaluation result output unit 118 outputs information about the evaluation result generated by the image evaluating unit 112.

The location to which a recording medium having color measurement portions printed thereon is output is a second output location, which may be different from a location to which a recording medium having an image evaluated as satisfying quality requirements printed thereon is output.

If it is determined in step S410 that a difference in color between a measured color value measured by the colorimeter and a reference value exceeds the predetermined threshold, the process may return to step S404 without proceeding to step S420, and printing of color measurement portions may be consecutively performed.

The exemplary embodiments have been described above. In the case of printing a composite image in which an image based on a print request is combined with an image of color measurement portions, color measurement portions may be combined every time predetermined pages are printed, without being printed on each page of an image that is based on a print request, and an arithmetic operation that is based on color measurement of the color measurement portions may be performed for every predetermined pages.

The evaluation result output unit 118 may display, on the UI device 10, a difference value in color between a measured color value obtained by the colorimeter and a predetermined reference value for each color measurement portion. In this case, for example, the evaluation result output unit 118 may display difference values for individual color measurement portions in a bar graph or the like. Further, the evaluation result output unit 118 may display difference values for individual color measurement portions in descending order of the difference value, or in the order specified by a user.

In the description given above, values of the L*a*b* color system are obtained through color measurement using the colorimeter 22, and the obtained values are compared with reference data stored in the reference data memory 106. Alternatively, for example, values of the L*c*h color system may be obtained through color measurement using the colorimeter 22, and the obtained values may be compared with reference values of the L*c*h color system. Alternatively, values of the XYZ color system may be obtained and compared with reference values of the XYZ color system.

In the above-described exemplary embodiments, if it is determined that a difference in color between a measured color value obtained through color measurement using the colorimeter and a reference value exceeds a predetermined threshold, the corresponding page may be reprinted.

For example, if it is determined that a difference in color between a measured color value obtained through color measurement using the colorimeter and a reference value exceeds a predetermined threshold, the image forming apparatus 2 may stop print processing, perform density adjustment and gradation adjustment (for example, adjustment of the amount of toner and voltage) of the image forming apparatus 2, and restart print processing from the page in which the difference exceeds the threshold. Density adjustment and gradation adjustment in the image forming apparatus 2 may be performed in response to an instruction provided from a user. For example, if it is determined that a difference in color between a measured color value obtained through color measurement using the colorimeter and a reference value exceeds the predetermined threshold, the image forming apparatus 2 may stop print processing, output a warning, and cause a user to provide an instruction indicating whether or not density adjustment and gradation adjustment are to be performed. Further, in the flowcharts illustrated in FIGS. 15 and 16, adjustment for color conversion in steps S302 to S306 may be performed after printing is stopped in step S120.

Regarding adjustment for color conversion, adjustment using color chips for adjustment may be performed as well as color adjustment based on a color measurement result using color chips (color measurement portion) for a test. For example, if it is determined that a difference in color between a measured color value obtained through color measurement using the colorimeter and a reference value exceeds the predetermined threshold, print processing is stopped, and the image forming apparatus 2 prints out color chips for adjustment of a larger number of types of colors than the color chips for a test (for example, 900 to 1500 types). In accordance with the output of the color chips, a user performs color measurement using a colorimeter and inputs measured color values. Accordingly, the image forming apparatus 2 may create L*a*b*→CMYK color correction data or CMYK→CMYK color correction data, apply the created data to processing of L*a*b*→CMYK color correction or CMYK→CMYK color correction of the image forming apparatus 2, and then restart printing from the page in which the difference exceeds the threshold.

If it is determined that a difference in color between a measured color value obtained through color measurement using the colorimeter and a reference value exceeds the predetermined threshold, the image forming apparatus 2 may stop print processing, and output a warning to cause a user to remove a recording medium in which the difference in color exceeds the threshold from among recording media on which printing has been performed. Upon receiving an input indicating that the recording medium has been removed by the user, the image forming apparatus 2 may perform adjustment, such as density adjustment, gradation adjustment, and color conversion adjustment, and may restart print processing from the page in which the difference exceeds the threshold.

Alternatively, the page in which it is determined that a difference in color between a measured color value obtained through color measurement using the colorimeter and a reference value exceeds the predetermined threshold may be stored. After the print job has finished, adjustment such as density adjustment, gradation adjustment, and color conversion adjustment may be performed, and after the adjustment, the image forming apparatus 2 may perform reprinting on the page in which the difference exceeds the threshold among the pages to be printed in the print job. Furthermore, after the reprinting has finished, a page replacement procedure may be displayed or printed for the recording media on which printing has been performed through the printing and reprinting. Specifically, for example, an image of a page to be replaced may be displayed or printed. In this case, not the entire image of the page to be replaced, but part of the image (for example, an image showing a page number, or a characteristic image of the page, such as a photograph) may be extracted and output.

The description has been given of the image forming apparatus 2 that performs printing on a cut sheet, but the exemplary embodiments may be applied to an image forming apparatus that performs printing on a continuous sheet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a color measurement portion printing unit that prints at least one color measurement portion;
    a colorimeter that measures a color of the color measurement portion printed by the color measurement portion printing unit;
    an image evaluating unit that evaluates, on the basis of a measured color value obtained by the colorimeter and a predetermined reference value, whether or not an image printed in response to a print request satisfies quality requirements that are based on a predetermined standard; and
    an output unit that outputs, to an output location, a recording medium on which an image evaluated as satisfying the quality requirements by the image evaluating unit is printed, and that outputs, to another output location, a recording medium on which an image evaluated as not satisfying the quality requirements by the image evaluating unit is printed,
    wherein the image evaluating unit evaluates whether or not the image satisfies the quality requirements, on the basis of a measured color value of a color measurement portion whose color is the same as a color used in the image or whose color difference from the color used in the image is within a predetermined range, among a plurality of color measurement portions printed by the color measurement portion printing unit.

2. The image forming apparatus according to claim 1, wherein
    the color measurement portion printing unit prints a color measurement portion which is compliant with a standard about colors for printing,
    the colorimeter is a spectral colorimeter that measures a color of the color measurement portion printed by the color measurement portion printing unit, and
    the image evaluating unit evaluates, on the basis of a measured color value obtained by the spectral colorimeter and a reference value compliant with the standard, whether or not the image satisfies the standard.

3. The image forming apparatus according to claim 2, further comprising:
    a selecting unit that selects any one of a plurality of different standards about colors for printing,
    wherein the image evaluating unit evaluates whether or not the image satisfies the standard selected by the selecting unit.

4. The image forming apparatus according to claim 1, further comprising:
    a warning unit that outputs a warning in a case where the image evaluating unit evaluates that the image does not satisfy the quality requirements.

5. The image forming apparatus according to claim 1, further comprising:
    a stopping unit that stops printing of an image in a case where the image is evaluated as not satisfying the quality requirements by the image evaluating unit.

6. The image forming apparatus according to claim 1, wherein, in a case where a difference in color between a measured color value of a color measurement portion printed by the color measurement portion printing unit and a reference value for the measured color value exceeds a predetermined threshold, if a percentage of a color corresponding to a color of the color measurement portion in the image is lower than or equal to a predetermined percentage, the image evaluating unit evaluates that the image satisfies the quality requirements.

7. The image forming apparatus according to claim 1, further comprising:
    an evaluation result output unit that outputs information about an evaluation result generated by the image evaluating unit.

8. The image forming apparatus according to claim 7, wherein the evaluation result output unit outputs information by specifying an area of a color corresponding to a color measurement portion in which a difference in color between a measured color value and a reference value for the measured color value exceeds a predetermined threshold, in an image evaluated as not satisfying the quality requirements by the image evaluating unit.

9. The image forming apparatus according to claim 1, further comprising:
a difference value display that sequentially displays, for each of color measurement portions, a difference value about a color between the measured color value obtained by the colorimeter and the predetermined reference value.

10. The image forming apparatus according to claim 1, further comprising:
a color conversion adjustment unit that performs adjustment for color conversion applied to a print request, on the basis of the measured color value obtained by the colorimeter and the predetermined reference value.

11. The image forming apparatus according to claim 10, wherein the color conversion adjustment unit performs adjustment for color conversion of a primary color, in the color conversion applied to a print request.

12. An image forming apparatus comprising:
a color measurement portion printing unit that prints at least one color measurement portion;
a colorimeter that measures a color of the color measurement portion printed by the color measurement portion printing unit; an image evaluating unit that evaluates on the basis of a measured color value obtained by the colorimeter and a predetermined reference value, whether or not an image printed in response to a print request satisfies quality requirements that are based on a predetermined standard; and
a stopping unit that stops printing of an image in a case where the image is evaluated as not satisfying the quality requirements by the image evaluating unit,
wherein the image evaluating unit evaluates whether or not the image satisfies the quality requirements, on the basis of a measured color value of a color measurement portion whose color is the same as a color used in the image or whose color difference from the color used in the image is within a predetermined range, among a plurality of color measurement portions printed by the color measurement portion printing unit,
wherein the stopping unit stops printing of an image in a case where the image is evaluated as not satisfying the quality requirements by the image evaluating unit a predetermined consecutive number of times.

13. An image forming apparatus comprising:
a color measurement portion printing unit that prints at least one color measurement portion;
a colorimeter that measures a color of the color measurement portion printed by the color measurement portion printing unit; and
an image evaluating unit that evaluates, on the basis of a measured color value obtained by the colorimeter and a predetermined reference value, whether or not an image printed in response to a print request satisfies quality requirements that are based on a predetermined standard,
wherein the image evaluating unit evaluates whether or not the image satisfies the quality requirements, on the basis of a measured color value of a color measurement portion whose color is the same as a color used in the image or whose color difference from the color used in the image is within a predetermined range, among a plurality of color measurement portions printed by the color measurement portion printing unit,
wherein the color measurement portion printing unit prints, every predetermined pages, a color measurement portion on a recording medium on which an image has not been printed in response to a print request.

14. The image forming apparatus according to claim 13, wherein, in a case where a difference in color between a measured color value obtained by the colorimeter and a reference value for the measured color value exceeds a predetermined threshold, the color measurement portion printing unit consecutively prints color measurement portions on a recording medium.

15. The image forming apparatus according to claim 1, wherein
the color measurement portion printing unit prints, every predetermined pages, a color measurement portion on a recording medium on which an image has not been printed in response to a print request, and
the output unit outputs, to an output location, a recording medium on which a color measurement portion is printed by the color measurement portion printing unit, and outputs, to another output location, a recording medium on which an image evaluated as satisfying the quality requirements by the image evaluating unit is printed.

16. An image forming apparatus comprising:
a color measurement portion printing unit that prints at least one color measurement portion;
a colorimeter that measures a color of the color measurement portion printed by the color measurement portion printing unit;
an image evaluating unit that evaluates, on the basis of a measured color value obtained by the colorimeter and a predetermined reference value, whether or not an image printed in response to a print request satisfies quality requirements that are based on a predetermined standard; and
a color conversion adjustment unit that performs adjustment for color conversion applied to a print request, on the basis of the measured color value obtained by the colorimeter and the predetermined reference value,
wherein the image evaluating unit evaluates whether or not the image satisfies the quality requirements, on the basis of a measured color value of a color measurement portion whose color is the same as a color used in the image or whose color difference from the color used in the image is within a predetermined range, among a plurality of color measurement portions printed by the color measurement portion printing unit,
wherein the color conversion adjustment unit performs adjustment for color conversion after a predetermined number of pages have been printed since start of printing.

17. The image forming apparatus according to claim 16, further comprising:
a setting unit that sets the number of pages to be printed before color conversion starts, on the basis of a variable value of a predetermined target to be measured in printing that is consecutively performed,
wherein the color conversion adjustment unit performs adjustment for color conversion after the number of pages set by the setting unit have been printed since start of printing.

18. An image forming method comprising:
printing at least one color measurement portion;
measuring a color of the printed color measurement portion using a colorimeter;
evaluating, on the basis of a measured color value and a predetermined reference value, whether or not an image printed in response to a print request satisfies quality requirements that are based on a predetermined standard;
outputting, to an output location, a recording medium on which an image evaluated as satisfying the quality requirements by the image evaluating unit is printed, and outputting, to another output location, a recording medium on which an image evaluated as not satisfying the quality requirements by the image evaluating unit is printed,
wherein the evaluating includes evaluating whether or not the image satisfies the quality requirements, on the basis of a measured color value of a color measurement portion whose color is the same as a color used in the image or whose color difference from the color used in the image is within a predetermined range, among a plurality of color measurement portions printed in the printing.

19. An image forming apparatus comprising:
a color measurement portion printing unit that prints at least one color measurement portion;
a colorimeter that measures a color of the color measurement portion printed by the color measurement portion printing unit;
an image evaluating unit that evaluates, on the basis of a measured color value obtained by the colorimeter and a predetermined reference value, whether or not an image printed in response to print request satisfies quality requirements that are based on a predetermined standard; and
a reprinting unit that performs reprinting on an image evaluated as not satisfying the quality requirements by the image evaluating unit,
wherein the image evaluating unit evaluates whether or not the image satisfies the quality requirements, on the basis of a measured color value of a color measurement portion whose color is the same as a color used in the image or whose color difference from the color used in the image is within a predetermined range, among a plurality of color measurement portions printed by the color measurement portion printing unit.

* * * * *